(12) United States Patent
Wang et al.

(10) Patent No.: US 12,313,947 B2
(45) Date of Patent: May 27, 2025

(54) DISPLAY PANEL AND DISPLAY DEVICE

(71) Applicants: Beijing BOE Optoelectronics Technology Co., Ltd., Beijing (CN); BOE Technology Group Co., Ltd., Beijing (CN)

(72) Inventors: Peipei Wang, Beijing (CN); Ruomei Bian, Beijing (CN); Yong Zhang, Beijing (CN); Jian Wang, Beijing (CN); Yao Bi, Beijing (CN); Honggui Jin, Beijing (CN); Zhilong Duan, Beijing (CN); Yang Liu, Beijing (CN); Jiulei Zhou, Beijing (CN); Donghua Zhang, Beijing (CN); Yue Yang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/578,030

(22) PCT Filed: Oct. 28, 2022

(86) PCT No.: PCT/CN2022/128358
§ 371 (c)(1),
(2) Date: Jan. 10, 2024

(87) PCT Pub. No.: WO2024/087198
PCT Pub. Date: May 2, 2024

(65) Prior Publication Data
US 2025/0093720 A1 Mar. 20, 2025

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01)

(58) Field of Classification Search
CPC .................. G02F 1/136286; G02F 1/1368
See application file for complete search history.

(56) References Cited

U.S. PATENT DOCUMENTS

2015/0357394 A1* 12/2015 Wang ............... H10K 59/35
257/40
2019/0079328 A1* 3/2019 Wang ............... H10D 86/021
(Continued)

FOREIGN PATENT DOCUMENTS

CN 104730781 A 6/2015
CN 205621414 U 10/2016
(Continued)

OTHER PUBLICATIONS

International Search Report and Written Opinion mailed on Apr. 30, 2023, in corresponding PCT/CN2022/128358, 7 pages.

*Primary Examiner* — Kevin Quarterman
(74) *Attorney, Agent, or Firm* — XSENSUS LLP

(57) ABSTRACT

The present disclosure provides a display panel. The display panel includes a base substrate, a first conductive layer and an active layer that are stacked in sequence. The first conductive layer includes a plurality of gate signal lines. The gate signal line includes a body part and a plurality of additional parts. An orthographic projection of the body part on the base substrate extends along a first direction. The plurality of additional parts are distributed at intervals in the first direction and coupled to a side of the body part in a second direction. The additional part is used to form a gate of a driving transistor. The active layer includes a plurality of active structures disposed corresponding to the plurality of additional parts. Orthographic projections of the plurality (Continued)

of active structures on the base substrate are separated from each other.

18 Claims, 17 Drawing Sheets

(56) References Cited

U.S. PATENT DOCUMENTS

| | | | | |
|---|---|---|---|---|
| 2019/0164998 A1* | 5/2019 | Cho | ............... | H10D 86/441 |
| 2020/0411611 A1* | 12/2020 | Liu | ............... | H10K 71/00 |
| 2021/0028258 A1* | 1/2021 | Lee | ............... | H10K 59/1213 |
| 2021/0066428 A1* | 3/2021 | Tao | ............... | H10K 71/00 |
| 2021/0126075 A1* | 4/2021 | Wang | ............ | H10K 59/1213 |
| 2021/0159299 A1* | 5/2021 | Wang | ............ | H10K 59/131 |
| 2022/0310023 A1 | 9/2022 | Shang et al. | | |

FOREIGN PATENT DOCUMENTS

| | | |
|---|---|---|
| CN | 205665504 U | 10/2016 |
| CN | 212569365 U | 2/2021 |
| CN | 112885850 A | 6/2021 |
| CN | 114093898 A | 2/2022 |
| CN | 115152030 A | 10/2022 |
| WO | 2022/041240 A1 | 3/2022 |

\* cited by examiner

DISPLAY PANEL AND DISPLAY DEVICE

CROSS-REFERENCE TO RELATED APPLICATION

The present application is the 371 application of PCT Application No. PCT/CN2022/128358, filed on Oct. 28, 2022, the entire contents of which are hereby incorporated by reference.

TECHNICAL FIELD

The present disclosure relates to the field of display technologies, and in particular, to a display panel and a display device.

BACKGROUND

In recent years, LCD display products have shown a trend of diversification. Wearable products have derived low-frequency and low-power consumption requirements.

It should be noted that the information disclosed in the Background section above is only for enhancing the understanding of the background of the present disclosure, and thus may include information that does not constitute prior art known to those of ordinary skill in the art.

SUMMARY

The present disclosure provides a display panel and a display device.

According to an aspect of the present disclosure, there is provided a display panel. The display panel includes a plurality of pixel driving circuits distributed in an array along a first direction and a second direction. The pixel driving circuit includes a driving transistor, and a gate of the driving transistor is coupled to a gate signal line. The first direction is intersected with the second direction. The display panel further includes: a base substrate: a first conductive layer located on a side of the base substrate and including a plurality of gate signal lines, wherein the gate signal line includes a body part and a plurality of additional parts, an orthographic projection of the body part on the base substrate is extended along the first direction, the plurality of additional parts are distributed at intervals in the first direction and coupled to a side of the body part in the second direction, and the additional part is used to form the gate of the driving transistor; an active layer, located on a side of the first conductive layer away from the base substrate, wherein the active layer includes: a plurality of active structures disposed corresponding to the plurality of additional parts, orthographic projections of the plurality of active structures on the base substrate are separated from each other, the active structure includes a plurality of active parts separated from each other, and the active part is used to form a channel region of the driving transistor; wherein one of the additional parts corresponds to the plurality of active parts, and an orthographic projection of the additional part on the base substrate covers orthographic projections of the plurality of active parts corresponding to the additional part on the base substrate.

According to another aspect of the present disclosure, there is further provided a display device, including the display panel according to any embodiment of the present disclosure.

It should be noted that the above general description and the following detailed description are merely exemplary and explanatory and should not be construed as limiting of the disclosure.

BRIEF DESCRIPTION OF THE DRAWINGS

The drawings here are incorporated into and constitute a part of the specification, show embodiments in consistent with the present disclosure, and are used together with the description to explain principles of the present disclosure. Obviously, the drawings in the following description are only some embodiments of the present disclosure. For those of ordinary skill in the art, other drawings can be obtained based on these drawings without creative work.

FIG. 16b is a structural layout of a repeating unit of a first conductive layer in

FIG. 15:

DETAILED DESCRIPTION

Figure 1:
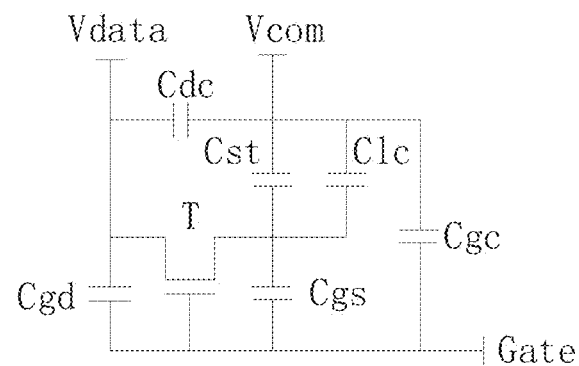
FIG. 1 is a schematic circuit structure diagram of a pixel driving circuit according to an embodiment of the present disclosure.

Example embodiments will now be described more fully with reference to the drawings. However, the example embodiments can be implemented in a variety of forms and should not be construed as being limited to the embodiments set forth herein; rather, these embodiments are provided so that the present disclosure will be more complete and comprehensive so as to convey the idea of the example embodiments to those skilled in this art. The same reference numerals in the drawings denote the same or similar structures, and the detailed description thereof will be omitted. In addition, the drawings are merely schematic representations of the present disclosure and are not necessarily drawn to scale.

The terms "one", "a", "the", "said", and "at least one" are used to indicate that there are one or more elements/components or the like: the terms "include" and "have" are used to indicate an open meaning of inclusion and mean that there may be additional elements/components/etc. in addition to the listed elements/components/etc.; and the terms "first", "second" and "third" etc. are used only as markers, and do not limit the number of objects.

A transistor refers to an element including at least three terminals: a gate, a drain, and a source. The transistor has a channel region between the drain (drain terminal, drain region, or drain electrode) and the source (source terminal, source region, or source electrode), and a current can flow through the drain, the channel region, and the source. The channel region refers to a region through which the current mainly flows.

A first electrode may be the drain and a second electrode may be the source, or the first electrode may be the source and the second electrode may be the drain. When transistors with opposite polarities are used, when a current direction changes during an operation of a circuit, or the like, functions of the "source" and the "drain" may be interchanged with each other sometimes. Therefore, in this specification, the "source" and the "drain" may be interchanged with each other.

LCD display products have shown a trend of diversification, and different products are seeking performance improvements. Wearable products, such as smart watches, bracelets, etc., increasingly tend to lightweight and convenient, and thus, low power consumption has become the direction for improving their performance. In order to respond to this trend, the display industry has introduced low-frequency and low-power consumption solutions with the consideration of characteristics of display requirements of the wearable products, which achieve a low power consumption effect by reducing a screen refresh frequency.

A refresh frequency of most display products on the market is 60 Hz, since the fastest electronic image speed the human eye can capture is 60 frames. Lowering the screen refresh rate will affect a visual effect of the human eye, resulting in unsmooth pictures, lags, and other experiences. The wearable products such as the smart watches and the bracelets have simple pictures and do not have fast picture switching, and lowering the refresh frequency is acceptable to the wearable products. However, the inventor found that lowering the frequency means increasing a driving time of each line of the screen. Longer driving time will cause greater coupling and current leakage between pixels, and the screen is subject to a risk of flicker.

Specifically, when a pixel voltage reverses with the change of positive and negative frames, and ΔVp coupling and ΔVp leakage are inconsistent, a brightness of a pixel changes with the change of the frame, causing the human eye to perceive flicker. In a low-frequency state, due to an increase in a holding time of one frame, the amount of leakage on a pixel electrode Vpixel increases and the screen flicker will be aggravated. The brightness of the pixel changes with the change of the frame, causing the human eye to perceive flicker.

$$\Delta Vp \text{ coupling} = \frac{Cgs}{Cgs + Clc + Cst} * (Vgh - Vgl) \quad (1)$$

$$\Delta Vp \text{ leakage} = \frac{Q}{C} = \frac{I_{off} * T}{Cst} = \frac{I_{off} * (1/f_{frame})}{Cst} \quad (2)$$

In formulas, ΔVp is a value of the pixel electrode changed due to a capacitive coupling effect caused by the on or off of Gate/Data, Cgs is a capacitance between a TFT gate and a pixel electrode, Cst is a capacitance between a common electrode and a pixel electrode, Clc is a liquid crystal capacitance, and VGH and VGL are turn-on and turn-off voltages of the TFT, respectively.

It can be seen from the above formulas (1) and (2) that ΔVp leakage is related to Ioff, frame frequency $f_{frame}$, and Cst. When Ioff decreases, ΔVp leakage decreases; and when frame frequency $f_{frame}$ decreases, ΔVp leakage increases; and when Cst increases, ΔVp leakage decreases.

Therefore, the inventor proposes a technical solution to solve the screen flicker problem under low-frequency driving by increasing the storage capacitance and reducing the off-state leakage. The technical solution of the present disclosure will be introduced in detail below with reference to the accompanying drawings.

FIG. 1 is a schematic circuit structure diagram of a pixel driving circuit according to an embodiment of the present disclosure. The pixel driving circuit may include a driving transistor T and a storage capacitor Cst. A gate of the driving transistor T is coupled to a gate signal terminal Gate, a first electrode of the driving transistor T is coupled to a data signal terminal Vdata, and a second electrode of the driving transistor T is coupled to a pixel electrode. A first electrode of the storage capacitor Cst is coupled to the pixel electrode, and a second electrode of the storage capacitor Cst is coupled to a common electrode Vcom.

Figure 2:
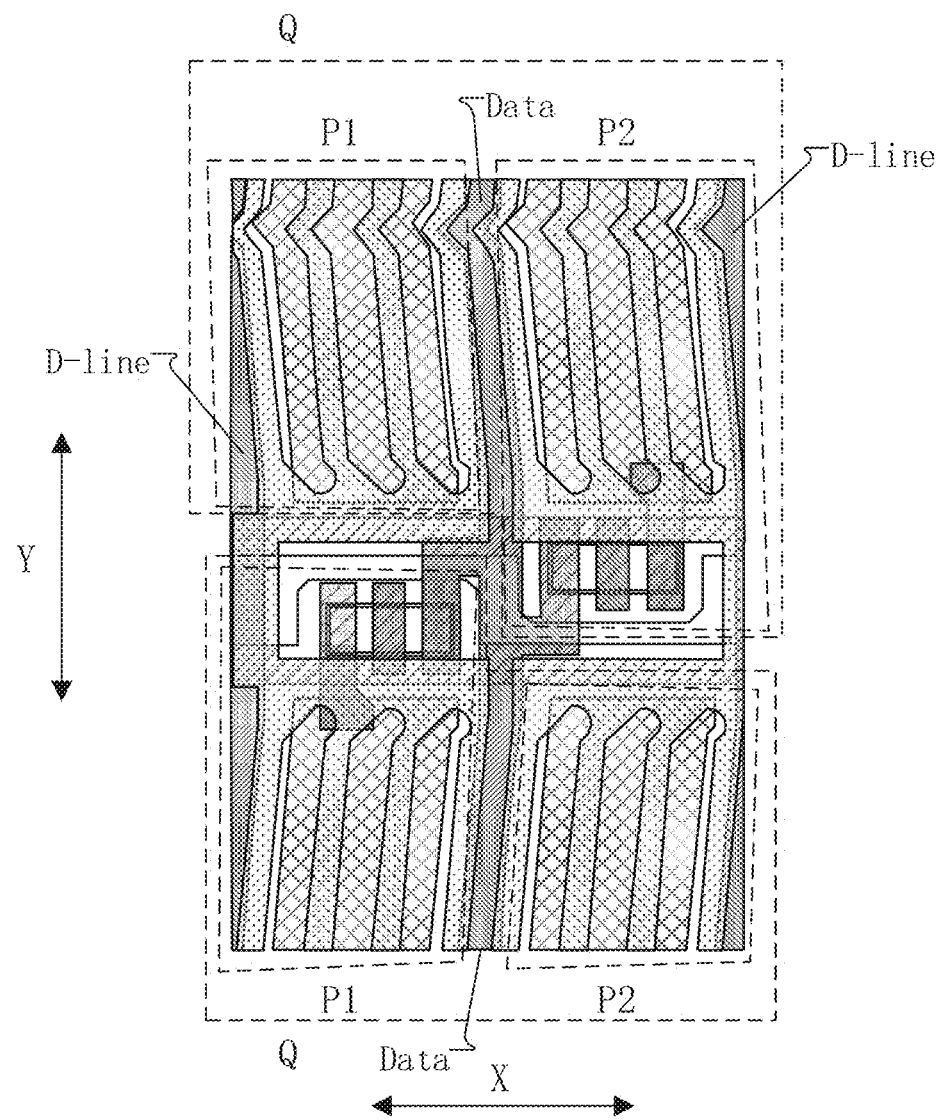
FIG. 2 is a structural layout of a display panel according to an embodiment of the present disclosure.
Figure 3:
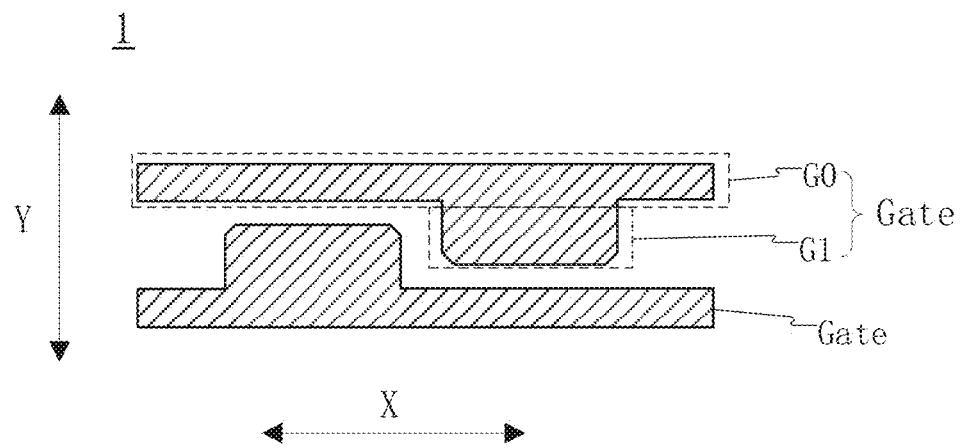
FIG. 3 is a structural layout of a first conductive layer in FIG. 2.
Figure 4:
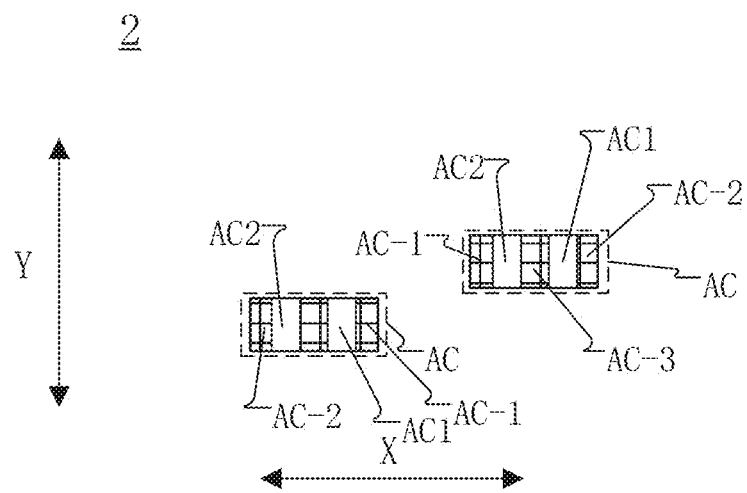
FIG. 4 is a structural layout of an active layer in FIG. 2.
Figure 5:
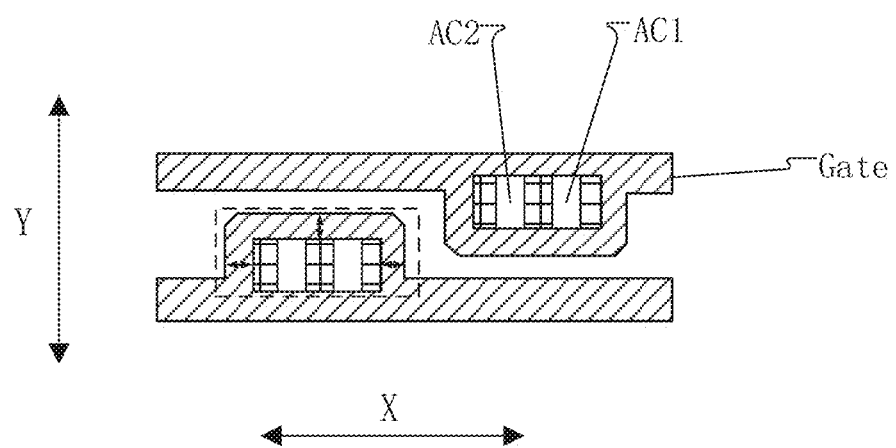
FIG. 5 is a stacked layout of a first conductive layer and an active layer.

Embodiments of the present disclosure provide a display panel. FIG. 2 is a structural layout of a display panel according to an embodiment of the present disclosure, FIG. 3 is a structural layout of a first conductive layer in FIG. 2, FIG. 4 is a structural layout of an active layer in FIG. 2, and FIG. 5 is a stacked layout of a first conductive layer and an active layer. As shown in FIGS. 2 to 5, the display panel includes a plurality of pixel driving circuits distributed in an array along a first direction X and a second direction Y. The pixel driving circuit is configured to drive a light-emitting device to emit light. The light-emitting device may be, for example, a liquid crystal, and accordingly, the display panel of the present disclosure may be a liquid crystal display panel. The first direction X is intersected with the second direction Y. The display panel may further include a base substrate, a first conductive layer 1 and an active layer 2. The first conductive layer 1 is located on a side of the base substrate, and may include a plurality of gate signal lines Gate. The gate signal line Gate includes a body part G0 and a plurality of additional parts G1. An orthographic projection of the body part G0 on the base substrate extends along the first direction X, and the plurality of additional parts G1 are distributed at intervals in the first direction Y and are coupled to a side of the body part G0 in the second direction Y. The additional part G1 is used to form the gate of the driving transistor T. The active layer 2 is located on a side of the first conductive layer 1, and the active layer 2 may include a plurality of active structures AC. Orthographic projections of the plurality of active structures AC on the base substrate are separated from each other. The active structure AC includes a plurality of active parts separated from each other, and the active part is used to form a channel region of the driving transistor T. One additional part G1 corresponds to a plurality of active parts, and an orthographic projection of the additional part G1 on the base substrate covers orthographic projections of the plurality of active parts corresponding to the additional part G1 on the base substrate.

In the display panel provided by the present disclosure, the additional part G1 of the gate signal line Gate protrudes from the side of the body part G0 in the second direction Y and is used to form the gate of the driving transistor T, so that the gate of the driving transistor T has an integral structure. The plurality of active parts are used to form the gate of the driving transistor T, and the orthographic projection of the additional part G1 on the base substrate covers the orthographic projections of the plurality of active parts corresponding to the additional part on the base substrate, so that the driving transistor T is formed with a multi-gate structure, in other words, the driving transistor T of the present disclosure has the multi-gate structure and the plurality of gates is the integral structure. In this way, an ability of the driving transistor T to suppress an off-state leakage can be improved, thereby reducing the off-state leakage of the driving transistor T, and in turn alleviating the screen flicker phenomenon when the display panel is driven at a low frequency. In addition, the gate of the driving transistor T of the present disclosure is an integral multi-gate structure, which, compared with a multi-gate structure with separated gates in the prior art, can further improve the ability to suppress the off-state leakage current, and has a better effect for alleviating the screen flicker phenomenon of the display panel under low-frequency driving.

As shown in FIGS. 2 to 5, in embodiments of the present disclosure, the first direction X may be a row direction, and the second direction Y may be a column direction. In addition, it should be understood that the active layer 2 in the present disclosure may be located on the side of the first conductive layer 1 away from the base substrate 1 to form a driving transistor T with a bottom gate structure: alternatively, the active layer 2 may also be located between the first conductive layer 1 and the base substrate to form a driving transistor T with a top gate structure. The bottom gate structure is only taken as an example for illustrative description in the present disclosure, and should not be understood as a limitation to the present disclosure.

The gate signal line Gate may be used to provide the gate signal terminal Gate in FIG. 1. The orthographic projection of the body part G0 of the gate signal line Gate on the base substrate extends along the first direction X. The additional part G1 of the gate signal line Gate is located on a side of the body part G0 in the second direction Y, and respective additional parts G1 on the same gate signal line Gate may be located on the same side of the body part G0 in the second direction Y. The additional part G1 of the gate signal line Gate may be used to form the gate of the driving transistor T.

It should be understood that a structure A extending in a direction C described in the present disclosure means that A may include a main part and a secondary part coupled to the main part, the main part is a line, line segment or bar-shaped body, the main part extends along the direction C, and a length of the main part extending in the direction C is greater than a length of the secondary part extending in other directions.

The orthographic projections of the plurality of active structures AC on the base substrate are separated from each other, which mean that the plurality of active structures AC are distributed at intervals on the active layer 2. One active structure AC includes a plurality of active parts independent from each other, and the active part is used to form the channel region of the driving transistor T, whereby one active structure AC forms a plurality of channel regions of the driving transistor T.

It should be understood that the orthographic projections of a structure A and another structure B on the base substrate being separated from each other described in the present disclosure means that there is no overlapping area between the orthographic projection of structure A on the base substrate and the orthographic projection of structure B on the base substrate, that is, structure A and structure B are structures independent from each other.

In the present disclosure, the orthographic projection of the additional part G1 on the base substrate covers the orthographic projection of the active part on the base substrate. The additional part G1 may include a plurality of sub-structures, and respective sub-structures are in a one-to-one correspondence with respective active parts. An orthographic projection of a sub-structure on the base substrate may cover an orthographic projection of the corresponding active part on the base substrate. Correspondingly, the sub-structure of the additional part G1 forms the gate of the driving transistor T, and thus, an orthographic projection of one additional part G1 on the base substrate covers the orthographic projections of the plurality of active parts corresponding to the additional part G1 on the base substrate, which means that one additional part G1 forms a plurality of gates of the driving transistor T, and furthermore means that the additional part G1 with an integral structure forms the plurality of gates of the driving transistor T. In the present disclosure, the driving transistor T is formed with the multi-gate structure to increase a channel length of the driving transistor T, thereby reducing the off-state leakage current of the driving transistor T.

Specifically, according to an output current formula of the driving transistor T, $I=(\mu W C_{ox}/2L)(V_{gs}-V_{th})^2$, where $\mu$ is a carrier mobility, $C_{ox}$ is a gate capacitance per unit area, W is a channel width of the driving transistor T, L is a channel length of the driving transistor T, $V_{gs}$ is a gate-source voltage difference of the driving transistor T, and $V_{th}$ is a threshold voltage of the driving transistor T. It can be seen that in the present disclosure, the driving transistor is formed with the multi-gate structure to increase the channel length L of the driving transistor T, thereby reducing the off-state leakage current of the driving transistor T, and in turn alleviating the flicker and jitter phenomena of the display panel under the low frequency driving.

It should be understood that an orthographic projection of a structure A on the base substrate covering an orthographic projection of another structure B on the base substrate described in the present disclosure can be understood as that an outline of the projection of B on a plane of the base substrate is completely located within an outline of the projection of A on the same plane.

As shown in FIGS. 4 and 5, in an embodiment of the present disclosure, the plurality of active parts may include a plurality of first active parts AC1 and a plurality of second active parts AC2 spaced apart each other in the first direction X. One additional part G1 corresponds to one first active part AC1 and one second active part AC2, and an orthographic projection of the additional part G1 on the base substrate covers an orthographic projection of the corresponding first active part AC1 on the base substrate and an orthographic projection of the corresponding second active part AC2 on the base substrate. Specifically, one active structure AC includes a first active part AC1 and a second active part AC2, that is, one active structure AC includes two channel regions. The first active part AC1 and the second active part AC2 are spaced apart in the first direction X, that is, the first active part AC1 and the second active part AC2 are separated from each other in the first direction X. One additional part G1 corresponds to one first active part AC1 and one second active part AC2, that is, one additional part G1 corresponds to two channel regions, that is, one additional part G1 forms two gates of the driving transistor T. In other words, the transistor in embodiments of the present disclosure has a double-gate structure, and there is no hollow structure between the two gates.

It should be noted that in the present disclosure, the channel length of the driving transistor T is increased by forming the driving transistor T with the double-gate structure. Compared with a single-gate structure driving transistor with the same channel length, the driving transistor T with the double-gate structure in the present disclosure can further improve an ability of the driving transistor T to suppress the off-state leakage current, which is beneficial to further mitigating the low-frequency driving jitter problem of the display panel. For example, Table 1 illustratively shows a simulation comparison result of the present disclosure. It can be seen from Table 1 that by increasing the channel length of the driving transistor T, the double-gate structure driving transistor T of the present disclosure can reduce the off-state leakage current to 1.43 pA, which is significantly less than the off-state leakage current of the single-gate structure driving transistor T with a small channel length. Moreover, when the channel length is the same, the off-state leakage current of the single-gate structure driving transistor T is 1.53 pA, which is significantly larger than the off-state leakage current of the double-gate structure driving transistor T of the present disclosure. Therefore, forming the double-gate structure to increase the channel length of the driving transistor T can further improve the ability to suppress the off-state leakage current, that is, it can further reduce the off-state leakage current of the driving transistor T, thereby further alleviating the screen jitter phenomenon.

TABLE 1

| TFT type | Single-gate line type | Double-gate line type | Single-gate line type |
| --- | --- | --- | --- |
| W/L (μm) | 4/2.9 | 6.5/(2.9 + 2.9) | 6.5/5.8 |
| Ioff(pA) | 2.86 | 1.43 | 1.53 |

As shown in FIGS. 2 and 5, in an embodiment of the present disclosure, the orthographic projection of the additional part G1 on the base substrate may cover the orthographic projection of its corresponding active structure AC on the base substrate. That is, the orthographic projection of the active structure AC on the base substrate is completely located within the orthographic projection of the corresponding additional part G1 on the base substrate. In other words, an edge of the orthographic projection of the additional part G1 on the base substrate exceeds an edge of the orthographic projection of the corresponding active structure AC on the base substrate by a distance. For example, a distance between the edge of the orthographic projection of the active structure AC on the base substrate and the edge of the orthographic projection of the additional part G1 on the base substrate may be greater than or equal to 2.5 μm, which may be, for example, 2.5 μm, 2.6 μm, 2.7 μm or 2.8 μm, etc.

Thus, the gate signal line Gate can completely block the incident light on the light incident side, and can block the incident light from irradiating onto the active structure AC, thereby preventing the light from interfering with the active structure AC. In this embodiment, the orthographic projections of the additional part G1 and the active structure AC on the base substrate may both be rectangular. The distance between the edge of the orthographic projection of the active structure AC on the base substrate and the edge of the orthographic projection of the additional part G1 on the base substrate may be understood as a distance in the row or column direction between a side of a rectangle formed by the orthographic projection of the active structure AC on the base substrate and a side of a rectangle formed by the orthographic projection on the base substrate of the additional part G1 wrapped outside the active structure AC. In other embodiments of the present disclosure, the orthographic projections of the additional part G1 and the active structure AC on the base substrate may also be in other shapes, such as circles, ellipses, etc. In this case, the edge of the orthographic projection of the active structure AC on the base substrate is composed of multiple discrete nodes. A connection line between any node K and a center of the orthographic projection of the active structure AC on the base substrate forms an intersection M with the edge of the orthographic projection of the additional part G1 on the base substrate. A distance between the node K and the intersection M is the distance between the edge of the orthographic projection of the active structure AC on the base substrate and the edge of the orthographic projection of the additional part G1 on the base substrate.

It can be understood that the active structure AC may include a conductor part that has been conductorized and a semiconductor part that has not been conductorized (active part). The semiconductor part is used to form the channel region of the transistor, and the conductor part may, for example, used to connect the source and drain of the transistor. As shown in FIG. 4, in an embodiment of the present disclosure, the active structure AC in the active layer 2 may further include a first sub-active part AC-1, a second sub-active part AC-2 and a third sub-active part AC-3. The first sub-active part AC-1 is provided corresponding to the first active part AC1 and is coupled to a side of the first active part AC1. The first sub-active part AC-1 may be used to form the first electrode of the driving transistor T. The second sub-active part AC-2 is provided corresponding to the second active part AC2 and is coupled to a side of the second active part AC2 away from the first active part AC1. The second sub-active part AC-2 may be used to form the second electrode of the driving transistor T. The third sub-active part AC-3 is connected between the corresponding first active part AC1 and second active part AC2. In this embodiment, the first sub-active part AC-1 to the third sub-active part AC-3 may be conductorized, so that the first sub-active part AC-1 to the third sub-active part AC-3 are all conductor structures. It can be understood that the driving transistor of the present disclosure has the double-gate structure, which is equivalent to two transistors connected through the conductorized third sub-active part AC-3. In other words, the third sub-active part AC-3 serves as both the first electrode of one transistor and the second electrode of the other transistor.

Figure 6:
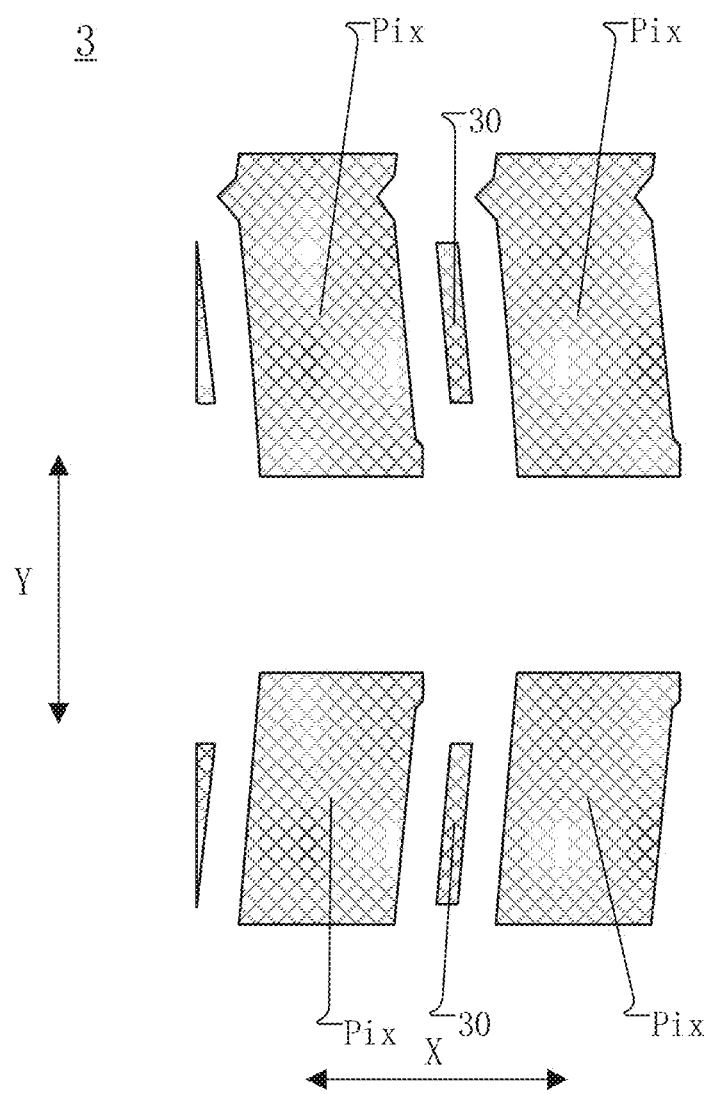
FIG. 6 is a structural layout of a second conductive layer in FIG. 2.
Figure 7:
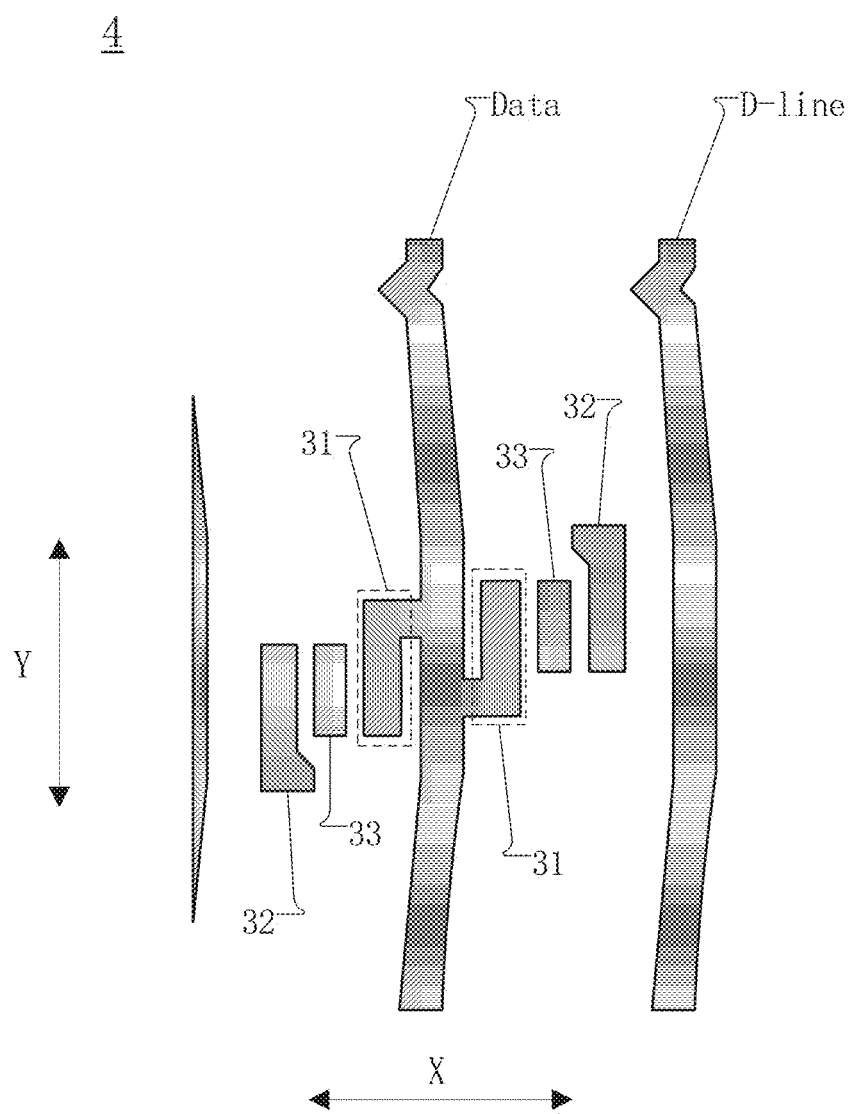
FIG. 7 is a structural layout of a third conductive layer in FIG. 2.
Figure 8:
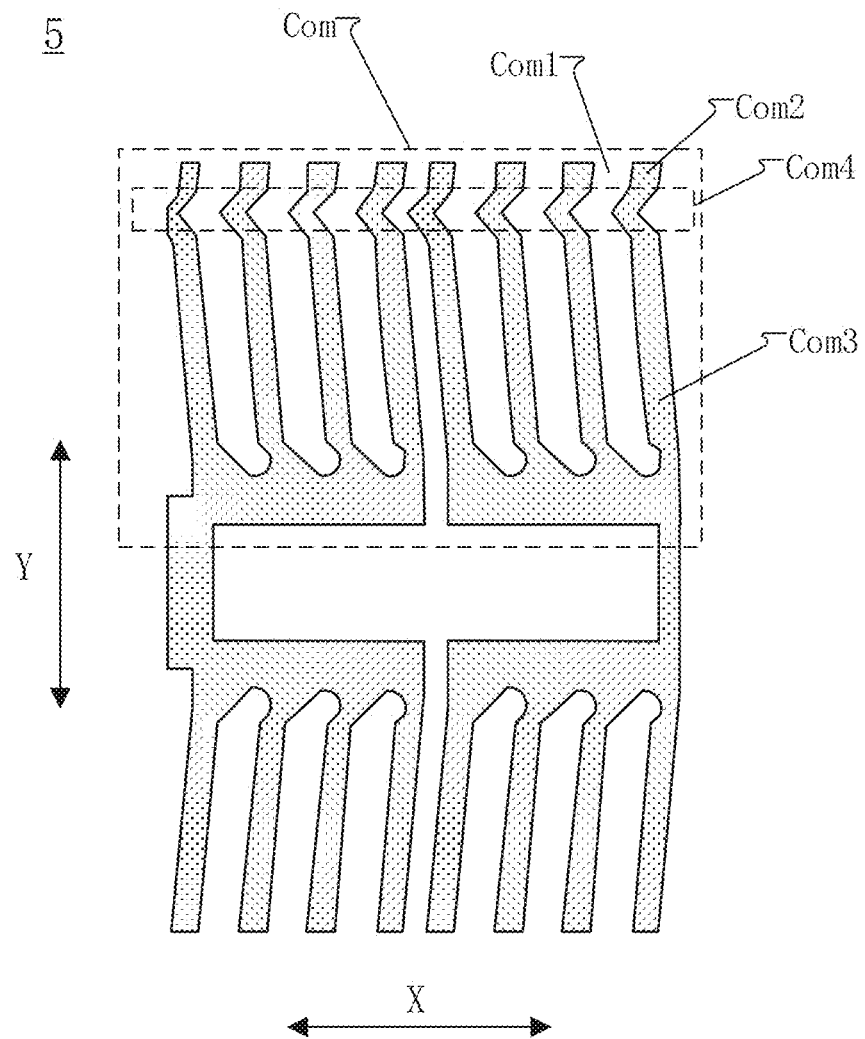
FIG. 8 is a structural layout of a fourth conductive layer in FIG. 2.
Figure 9:
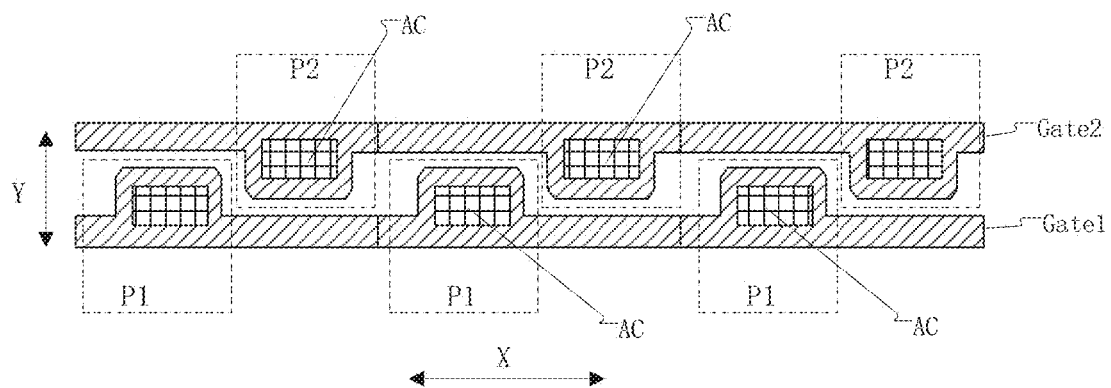
FIG. 9 is a schematic structural diagram of a first conductive layer and an active layer overlapping in a row direction.

In addition to the first conductive layer 1 and the active layer 2, the display panel of the present disclosure may further include a second conductive layer 3, a third conductive layer 4 and a fourth conductive layer 5. The first conductive layer 1, the active layer 2, the second conductive layer 3, the third conductive layer 4 and the fourth conductive layer 5 are sequentially stacked on a side of the base substrate. An insulation layer may be provided between the above functional layers. For example, there may be a gate insulation layer between the first conductive layer 1 and the active layer 2. FIG. 6 is a structural layout of a second conductive layer in FIG. 2, FIG. 7 is a structural layout of a third conductive layer in FIG. 2, FIG. 8 is a structural layout of a fourth conductive layer in FIG. 2, and FIG. 9 is a schematic structural diagram of a first conductive layer and an active layer overlapping in a row direction.

Figure 10:
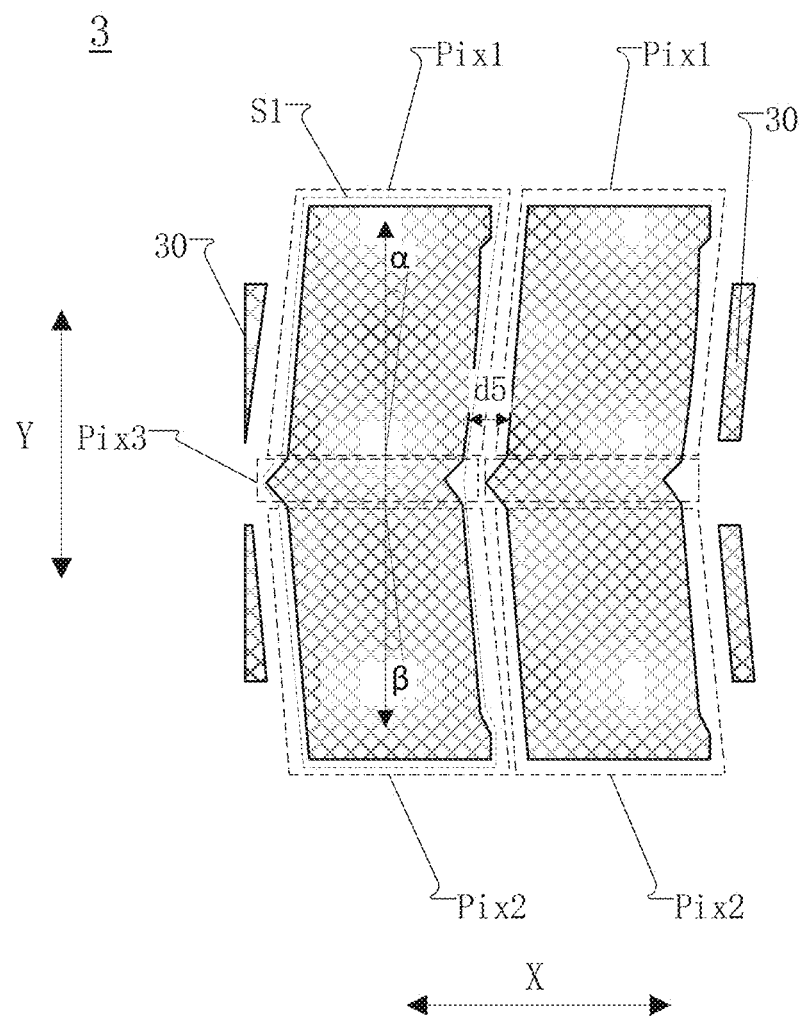
FIG. 10 is a schematic structural diagram of a complete first electrode structure in FIG. 2.

As shown in FIG. 6, in an embodiment of the present disclosure, the second conductive layer 3 may include a plurality of first electrode structures Pix provided in a one-to-one correspondence with additional parts G1, that is, one additional part G1 corresponds to one first electrode structure Pix. The first electrode structure Pix may be used to form the pixel electrode Vpixel and the first electrode of the storage capacitor Cst. In this embodiment, the first electrode structure Pix may be an electrode block. For example, FIG. 10 is a schematic structural diagram of a complete first electrode structure in FIG. 2. As shown in FIG. 10, the first electrode structure Pix may include a first electrode part Pix1 and a second electrode part Pix2, an extension direction of the first electrode part Pix1 is intersected with an extension direction of the second electrode part Pix2, and the first electrode part Pix1 and the second electrode part Pix2 are intersected at a first bending part Pix3. As shown in FIG. 10, the first electrode part Pix1 and the second electrode part Pix2 may each extend at a certain angle offset from the column direction, so as to be coupled at the first bending part Pix3. In this embodiment, the extension direction of the first electrode part Pix1 may have a first included angle α with the column direction, the extension direction of the second electrode part Pix2 may have a second included angle β with the column direction, and the first included angle α may be the same as the second included angle. In addition, an extension length of the first electrode part Pix1 may be the same as an extension length of the second electrode part Pix2, so that the first bending part Pix3 is located at a middle position of the first electrode structure Pix in the second direction Y, that is, the first electrode part Pix1 and the second electrode part Pix2 are intersected at the bending part Pix3 in the middle position of the first electrode structure Pix along the column direction. It should be noted that the extension length of the first electrode part Pix1 and the extension length of the second electrode part Pix2 being the same described in this embodiment may be that the extension length of the first electrode part Pix1 and the extension length of the second electrode part Pix2 are exactly the same, or the extension length of the first electrode part Pix1 and the extension length of the second electrode part Pix2 are very close. For example, a ratio of the extension length of the first electrode part Pix1 to the extension length of the second electrode part Pix2 is between 0.8 and 1.2, or for another example, an absolute value of a difference between the extension length of the first electrode part Pix1 and the extension length of the second electrode part Pix2 is within a set redundancy range. These examples may be considered as the extension length of the first electrode part Pix1 is the same as the extension length of the second electrode part Pix2. It should be understood that in other embodiments of the present disclosure, the first electrode structure Pix may also be other structures, for example, it may be a slit electrode, etc.

As shown in FIG. 6, in an embodiment of the present disclosure, the second conductive layer 3 may further include a backup conductive part 30 located between two first electrode structures Pix adjacent in the first direction X, That is, the backup conductive part 30 is distributed in a gap between the two first electrode structures Pix adjacent in the first direction X, and the backup conductive part 30 is separated from the first electrode structure Pix, that is, the backup conductive part 30 and the first electrode structure Pix are not coupled. The backup conductive part 30 may be provided in a one-to-one correspondence with a data signal line Data of the third conductive layer 4, and an orthographic projection of the backup conductive part 30 on the base substrate and an orthographic projection of the data signal line Data on the base substrate may have the same extension direction, and may be at least partially overlapped in the extension direction. For example, the orthographic projection of the data signal line Data on the base substrate may cover the orthographic projection of the backup conductive part 30 on the base substrate. The backup conductive part 30 may be coupled to the data signal line Data of the third conductive layer 4 through a via hole, so that the backup conductive part 30 becomes a parallel structure of the data signal line Data. In this way, during the use of the product, even if the data signal line Data is partially broken, data signal transmission may still be carried out through the backup conductive part 30 coupled thereto, so that the display panel will not be unusable due to the breakage of the data signal line Data, which improves the service life and reliability of the display panel to a certain extent.

In addition, when the third conductive layer 4 includes a virtual signal line D-line, the backup conductive part 30 may also be provided at a position corresponding to the virtual signal line D-line. For example, an orthographic projection of the virtual signal line D-line on the base substrate may cover an orthographic projection of its corresponding backup conductive part 30 on the base substrate.

In an embodiment of the present disclosure, the virtual signal line D-line may be coupled to a common electrode line in a non-display area, so that the virtual signal line D-line has the same potential as the common electrode.

As shown in FIG. 9, in an embodiment of the present disclosure, the plurality of pixel driving circuits may include first pixel driving circuits P1 and second pixel driving circuits P2 alternately distributed in sequence in the row direction, and the first pixel driving circuits P1 are located in the same column, and the second pixel driving circuits P2 are located in the same column. A gate signal line in the first pixel driving circuit P1 is a first gate signal line Gate1, and a gate signal line in the second pixel driving circuit P2 is a second gate signal line Gate2. Orthographic projections on the base substrate of the first gate signal line Gate1 and the second gate signal line Gate2 in a current row are respectively located on both sides in the column direction of an orthographic projection of the first electrode structure Pix in the current row on the base substrate. An additional part in the first gate signal line Gate1 in the current row is located on a side of the corresponding body part close to a second gate signal line Gate2 in a previous row: An additional part of the second gate signal line Gate2 in the previous row is located on a side of the corresponding body part close to the first gate signal line Gate1 in the current row: Therefore, a gate structure of the first pixel driving circuit P1 in the current row and a gate structure of the second pixel driving circuit P2 in the previous row are alternately distributed in sequence in the row direction.

As shown in FIG. 7, in an embodiment of the present disclosure, the third conductive layer 4 may include the data signal line Data. An orthographic projection of the data signal line Data on the base substrate may extend along the second direction Y, and the data signal line Data may be used to provide the data signal terminal Vdata in FIG. 1. The third conductive layer 4 may further include a first conductive part 31, a second conductive part 32 and a third conductive part 33. An orthographic projection of the first conductive part 31 on the base substrate may cover an orthographic projection of the first sub-active part AC-1 on the base substrate, and the first conductive part 31 is electrically coupled to the first sub-active part AC-1 to be coupled to the first electrode of the driving transistor T. An orthographic projection of the second conductive part 32 on the base substrate may cover an orthographic projection of the second sub-active part AC-2 on the base substrate, and the second conductive part 32 is electrically coupled to the second sub-active part AC-2 to be coupled to the second electrode of the driving transistor T. The third conductive part 33 is provided in a one-to-one correspondence with the third sub-active part AC-3. The third conductive part 33 is located between the first conductive part 31 and the second conductive part 32. An orthographic projection of the third conductive part 33 on the base substrate covers an orthographic projection of the corresponding third sub-active part AC-3 on the base substrate, and the third conductive part 33 is not coupled to the first conductive part 31 or the second conductive part 32.

In an embodiment of the present disclosure, two adjacent pixel units may reuse the same data signal line Data. For example, as shown in FIG. 2, the plurality of pixel driving circuits in the present disclosure may include first pixel driving circuits P1 and second pixel driving circuits P2 sequentially distributed at intervals in the first direction X, that is, there is one second pixel driving circuit P2 between two first pixel driving circuits P1 adjacent in the first direction X, in other words, there is one first pixel driving circuit P1 between two second pixel driving circuits P2 adjacent in the first direction X. The first pixel driving circuit P1 and the second pixel driving circuit P2 adjacent in the first direction X may form a repeating unit Q, and two repeating units Q adjacent in the second direction Y may reuse the same data signal line Data. Specifically, a first pixel driving circuit P1 in a repeating unit Q in a current row and a second pixel driving circuit P2 in a repeating unit Q in a previous row may reuse the same data signal line Data. By reusing the data signal line Data, the number of data signal lines Data can be reduced, which is conducive to optimizing the layout space and improving the space utilization of the layout.

As shown in FIGS. 2 and 7, in an embodiment of the present disclosure, the third conductive layer 4 may further include the virtual signal line D-line. An extension direction of an orthographic projection of the virtual signal line D-line on the base substrate may be the same as an extension direction of the orthographic projection of the data signal line Data on the base substrate, and the virtual signal line D-line may be located in a gap between two repeating units Q adjacent in the first direction X, so that the data signal line Data is distributed in the gap between the first pixel driving circuit P1 and the second pixel driving circuit P2 in the same repeating unit Q, and the virtual signal line D-line is distributed in a gap between two repeating units Q adjacent in the row direction. By arranging the virtual signal line D-line, the display uniformity of the display panel may be improved.

Figure 11A:
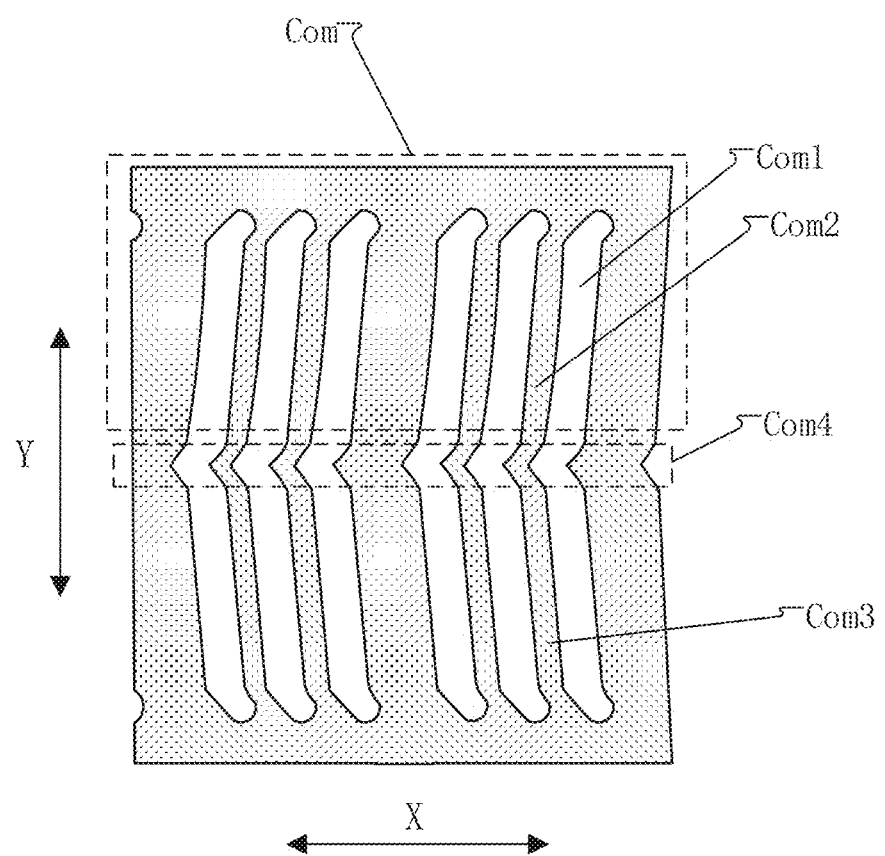
FIG. 11a is a schematic structural diagram of a complete second electrode structure in FIG. 2.

As shown in FIG. 8, in an embodiment of the present disclosure, the fourth conductive layer 5 may include a second electrode structure Com, and the second electrode structure Com may be used to form the common electrode Vcom and the second electrode of the storage capacitor Cst. FIG. 11a is a schematic structural diagram of a complete second electrode structure in FIG. 2. As shown in FIGS. 8 and 11a, the second electrode structure Com may include a slit electrode. Specifically, the slit electrode may include a slit part Com1 and a strip-shaped electrode part between adjacent slit parts Com1. The strip-shaped electrode part may include a plurality of first strip-shaped parts Com2 and a plurality of second strip-shaped parts Com3. An extension direction of the first strip-shaped part Com2 is intersected with an extension direction of the second strip-shaped part Com3, and the first strip-shaped part Com2 and the second strip-shaped part Com3 are coupled at a second bending part Com4. Similar to the first bending part Pix3 in the first electrode structure Pix, the second bending part Com4 may be located at a middle position in the column direction of the second electrode structure Com, and an orthographic projection of the second bending part Com4 on the base substrate may be overlapped with an orthographic projection of the first bending part Pix3 on the base substrate. Alternatively, in other embodiments of the present disclosure, the second electrode structure Com may also be other structures, for example, it may be an electrode block.

There is an overlapping part between the orthographic projection of the second electrode structure Com on the base substrate and the orthographic projection of the first electrode structure Pix on the base substrate. Since the first electrode structure Pix may form the first electrode of the storage capacitor Cst, and the second electrode structure Com may form the second electrode of the storage capacitor Cst, an overlapping area of the orthographic projections of the first electrode structure Pix and the second electrode structure Com on the base substrate determines a size of the storage capacitor Cst. In an embodiment of the present disclosure, an area of the orthographic projection of the first electrode structure Pix on the base substrate may be increased to increase the overlapping area of the orthographic projections of the first electrode structure and the second electrode structure Com, thereby increasing the storage capacitor Cst. For details, reference may be made to the introduction to subsequent embodiments.

It can be understood that the display panel may include a display area and the non-display area, and the non-display area surrounds the display area. In the present disclosure, the common electrode line may be provided in the non-display area, and the second electrode structure Com may extend to the non-display area to be coupled to the common electrode line.

Figure 11B:
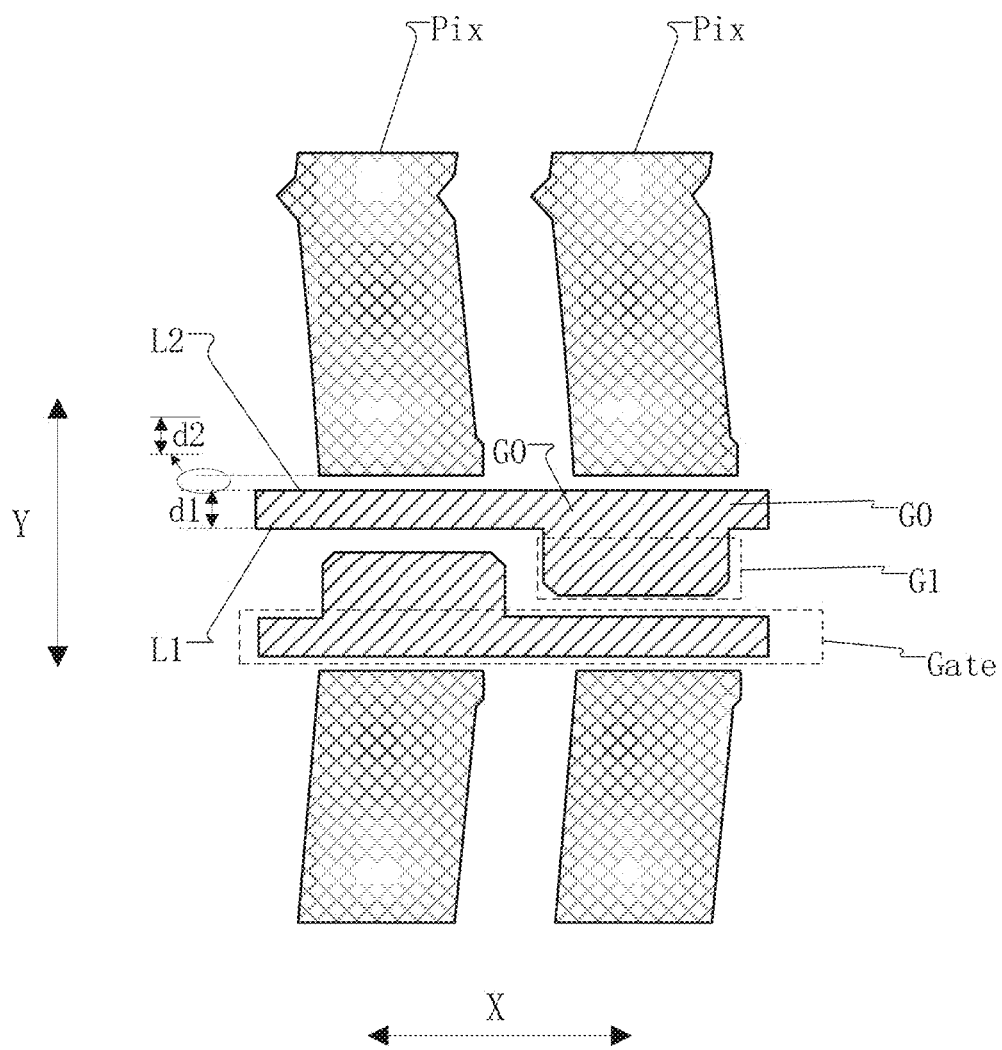
FIG. 11b is a stacked layout of a first conductive layer and a third conductive layer.

FIG. 11b is a stacked layout of a first conductive layer and a third conductive layer. As shown in FIG. 11b, in an embodiment of the present disclosure, the orthographic projection of the body part G0 of the gate signal line Gate on the base substrate has a first side L1 and a second side L2 opposite to each other in the column direction. The first side L1 is located on a side of the second side L2 away from an orthographic projection of the corresponding first electrode structure Pix on the base substrate. There is a first distance d1 between the first side L1 and the second side L2. There is a second distance d2 between the orthographic projection of the first electrode structure Pix on the base substrate and its corresponding second side L2. The second distance d2 is greater than or equal to 2.5 μm, and the first distance d1 is greater than the second distance d2. In this embodiment, by setting the distance in the column direction between the gate signal line and the first electrode structure Pix to be greater than or equal to 2.5 μm, it is possible to prevent the generation of a relatively large capacitance Cgs between the gate and the pixel electrode caused by the distance between the pixel electrode and the gate signal line being too close. In this way, the flicker phenomenon caused by the increase of Δvp in formula (1) can be avoided.

Figure 12:
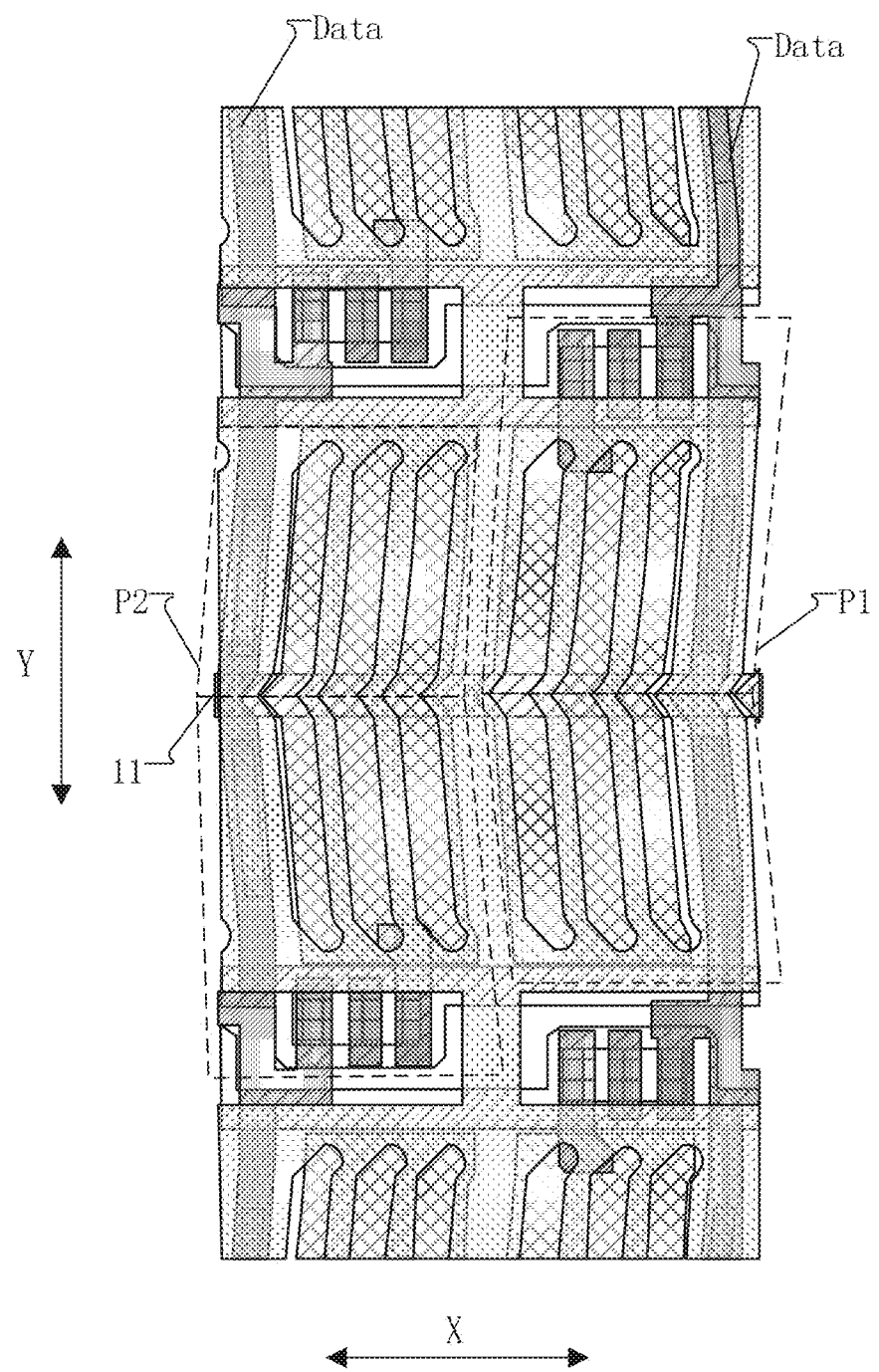
FIG. 12 is a structural layout of a display panel according to another embodiment of the present disclosure.
Figure 13:
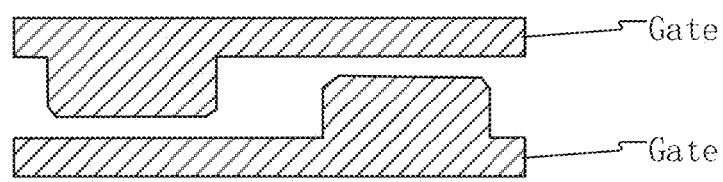
FIG. 13 is a structural layout of a first conductive layer in FIG. 12.
Figure 13:
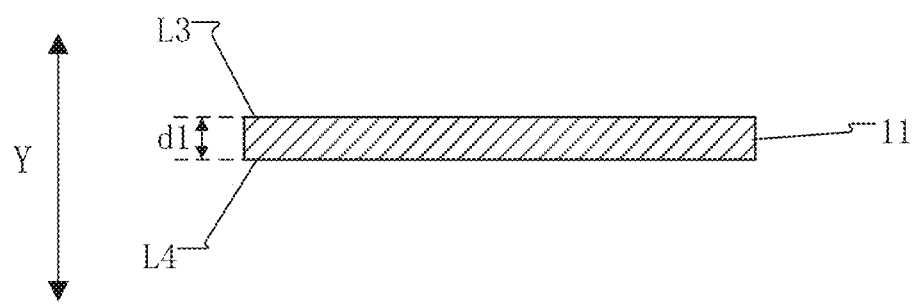
Figure 13:
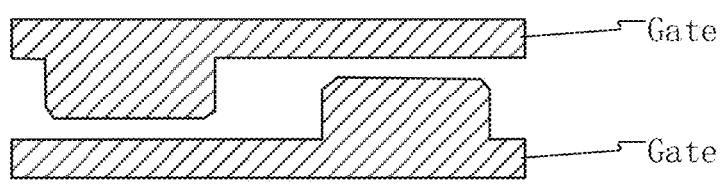
Figure 14:
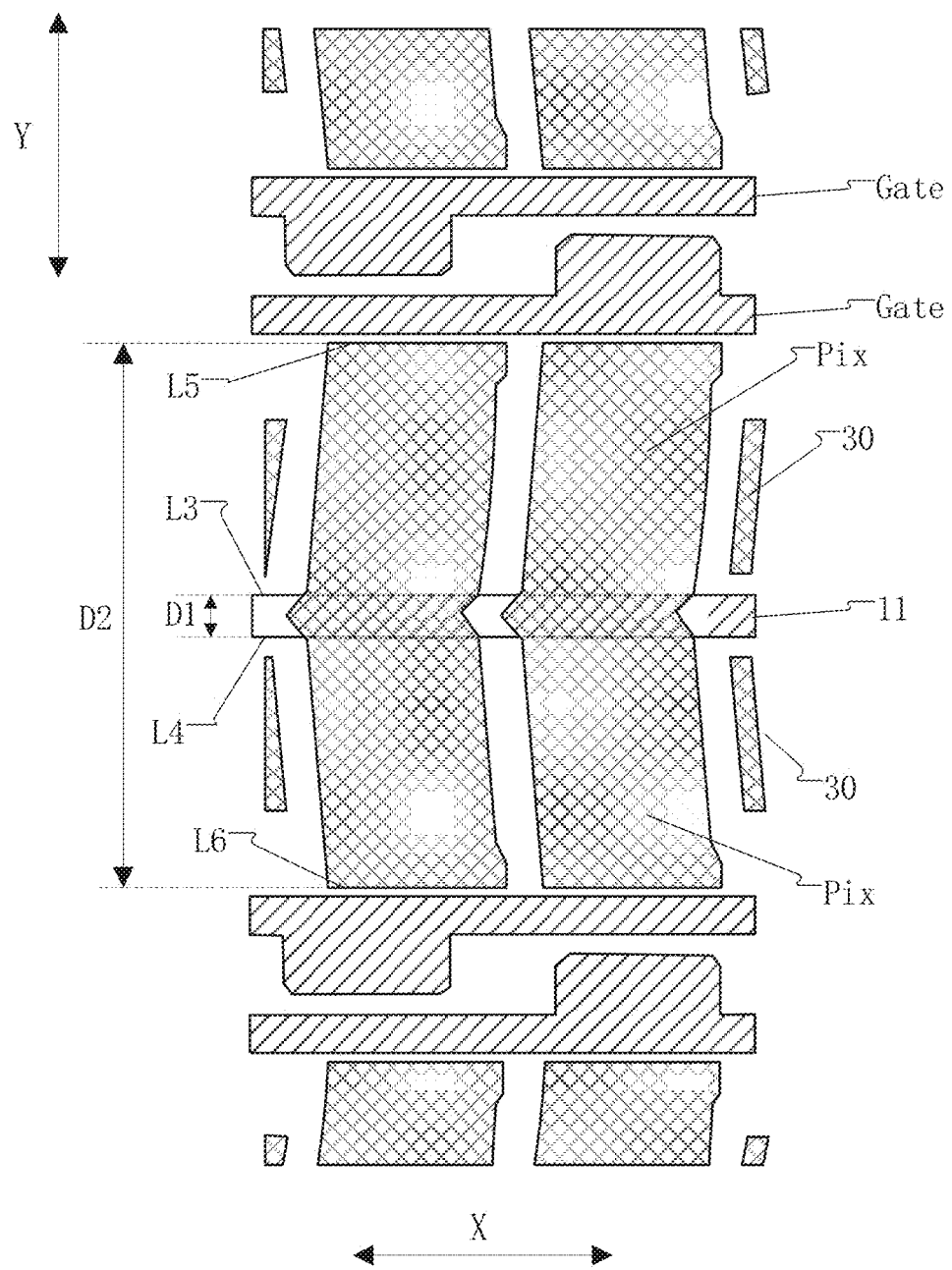
FIG. 14 is a stacked layout of a first conductive layer and a second conductive laver.

FIG. 12 is a structural layout of a display panel according to another embodiment of the present disclosure, FIG. 13 is a structural layout of a first conductive layer in FIG. 12, and FIG. 14 is a stacked layout of a first conductive layer and a second conductive layer. As shown in FIGS. 12 and 14, in an embodiment of the present disclosure, the first conductive layer 1 may further include a first conductive line 11. An orthographic projection of the first conductive line 11 on the base substrate may extend along the row direction, and the first conductive line 11 may extend from the display area to the non-display area and may be coupled to the common electrode line in the non-display area. The orthographic projection of the first conductive line 11 on the base substrate is at least partially overlapped with the orthographic projection of the first bending part Pix3 on the base substrate. The first conductive line 11 is coupled to the common electrode line, and the first conductive line 11 constitutes a part of the common electrode Vcom. Therefore, by overlapping the first conductive line 11 and the first bending part Pix3, the overlapping area between the pixel electrode Vpixel and the common electrode Vcom is increased to increase the storage capacitor Cst. As mentioned above, the first bending part Pix3 may be located at the middle position in the column direction of the first electrode structure Pix. Therefore, in this embodiment, the first conductive line 11 is formed at the middle position in the column direction of the first electrode structure Pix to increase the overlapping area of the common electrode Vcom and the pixel electrode Vpixel, thereby increasing the storage capacitor Cst. In this embodiment, the first conductive line 11 is formed at the middle position in the column direction of the first electrode structure Pix, which is far away from other structures of the first conductive layer 1 (including the gate signal line Gate), which will not affect a product design parameter of the display panel in the Array stage.

As shown in FIGS. 12 and 14, in an embodiment of the present disclosure, the orthographic projection of the first conductive line 11 on the base substrate may cover the orthographic projection of the first bending part Pix3 on the base substrate, so as to fully utilize a pixel space to increase a width of the first conductive line 11 in the column direction without affecting a pixel aperture ratio, thereby increasing the overlapping between the first conductive line 11 and the pixel electrode Vpixel to in turn increase an increase in the storage capacitor Cst.

As shown in FIG. 14, in an embodiment of the present disclosure, the orthographic projection of the first conductive line 11 on the base substrate has a third side L3 and a fourth side L4 opposite to each other in the column direction, and there is a first width D1 in the column direction between the third side L3 and the fourth side L4. The orthographic projection of the first electrode structure Pix on the base substrate has a fifth side L5 and a sixth side L6 opposite to each other in the column direction, and there is a second width D2 in the column direction between the fifth side L5 and the sixth side L6. A ratio of the first width D1 to the second width D2 may be 0.05 to 0.06, which may be, for example, 0.05, 0.054, 0.055, 0.058, 0.06, etc. Therefore, the width of the first conductive line 11 can be determined in the Array stage according to the size of the pixel electrode, and the capacitance increase of the storage capacitor Cst can be determined.

Figure 15:
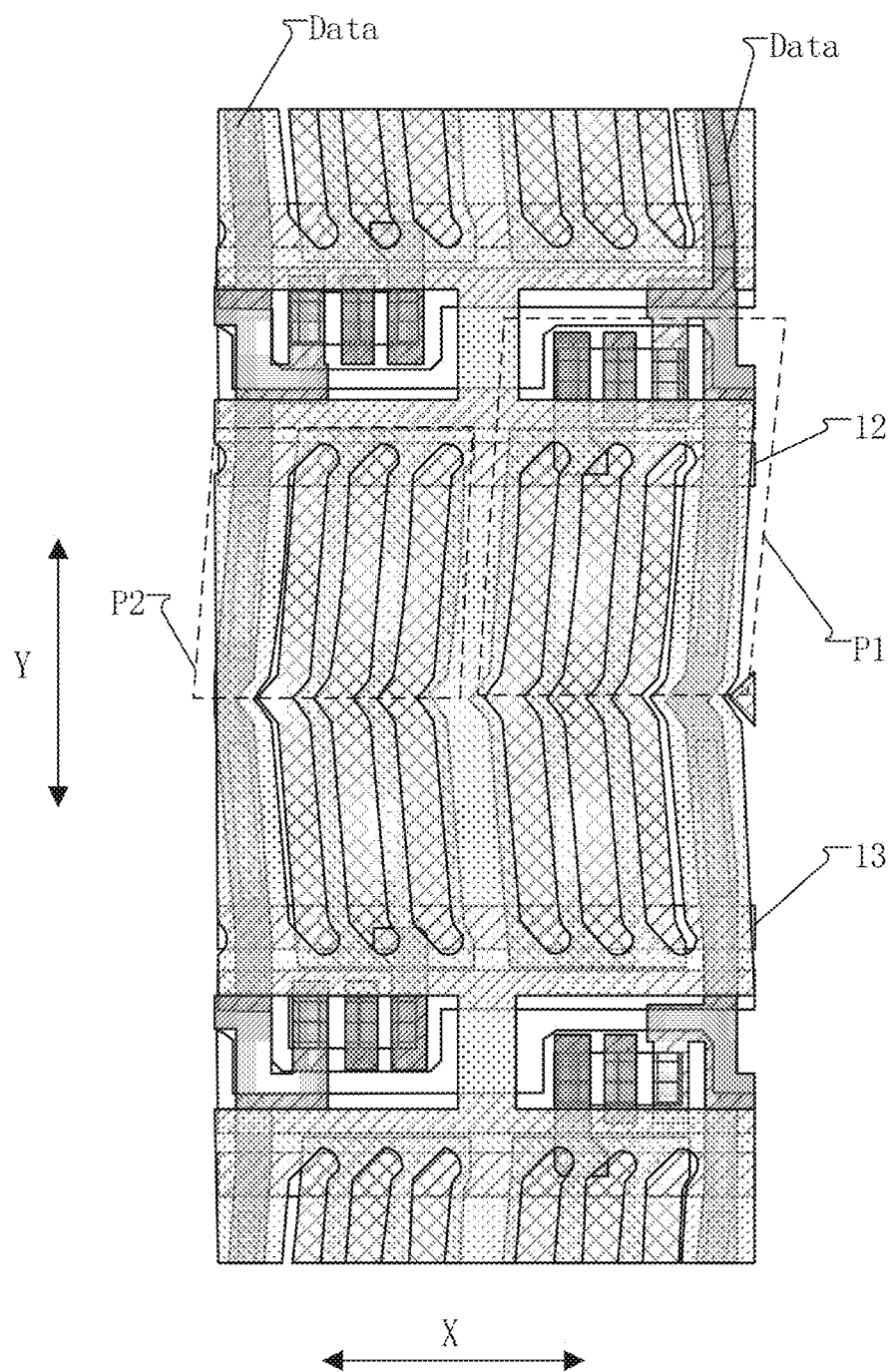
FIG. 15 is a structural layout of a display panel according to yet another embodiment of the present disclosure.
Figure 16A:
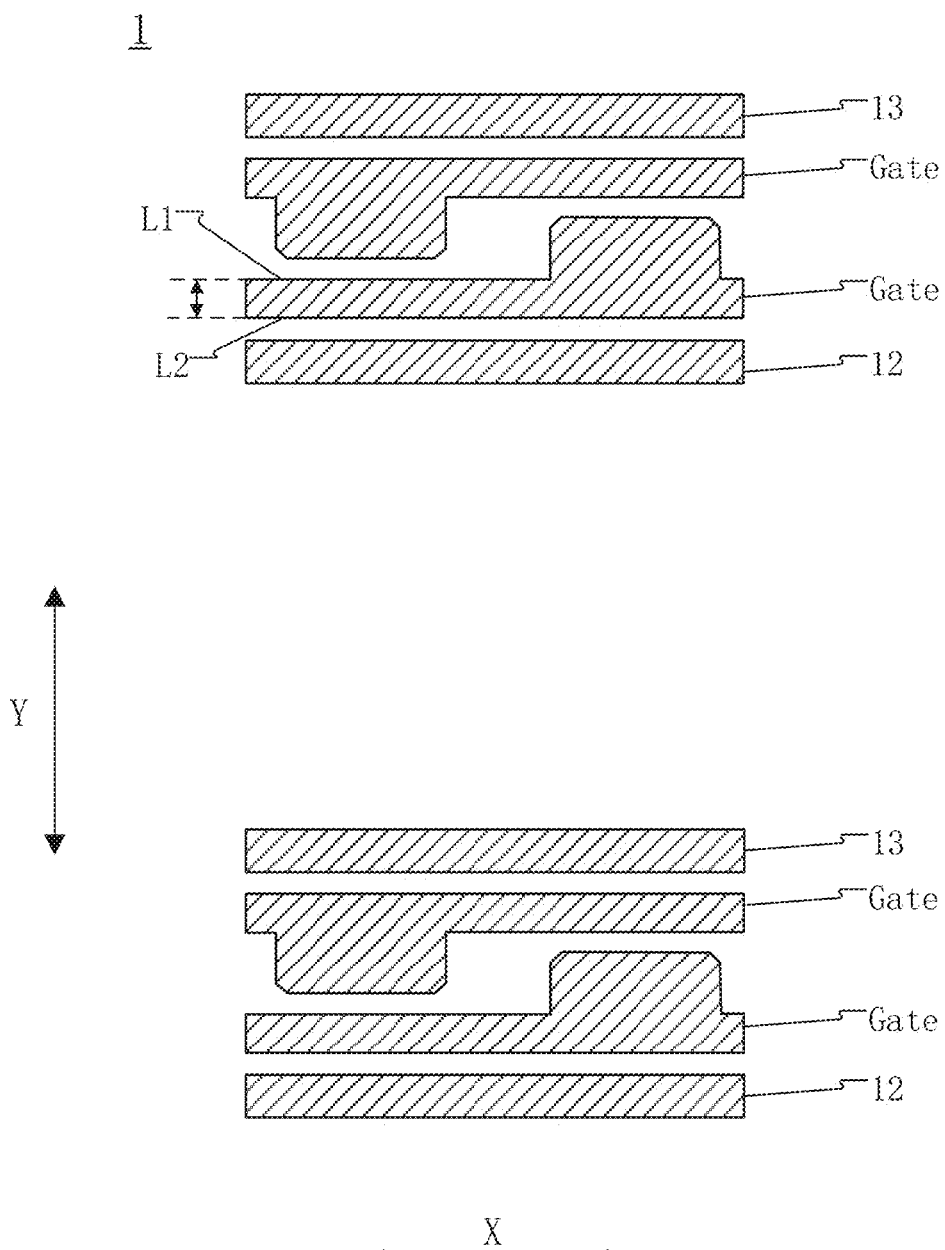
FIG. 16a is a structural layout of a first conductive layer in FIG. 15.
Figure 16B:
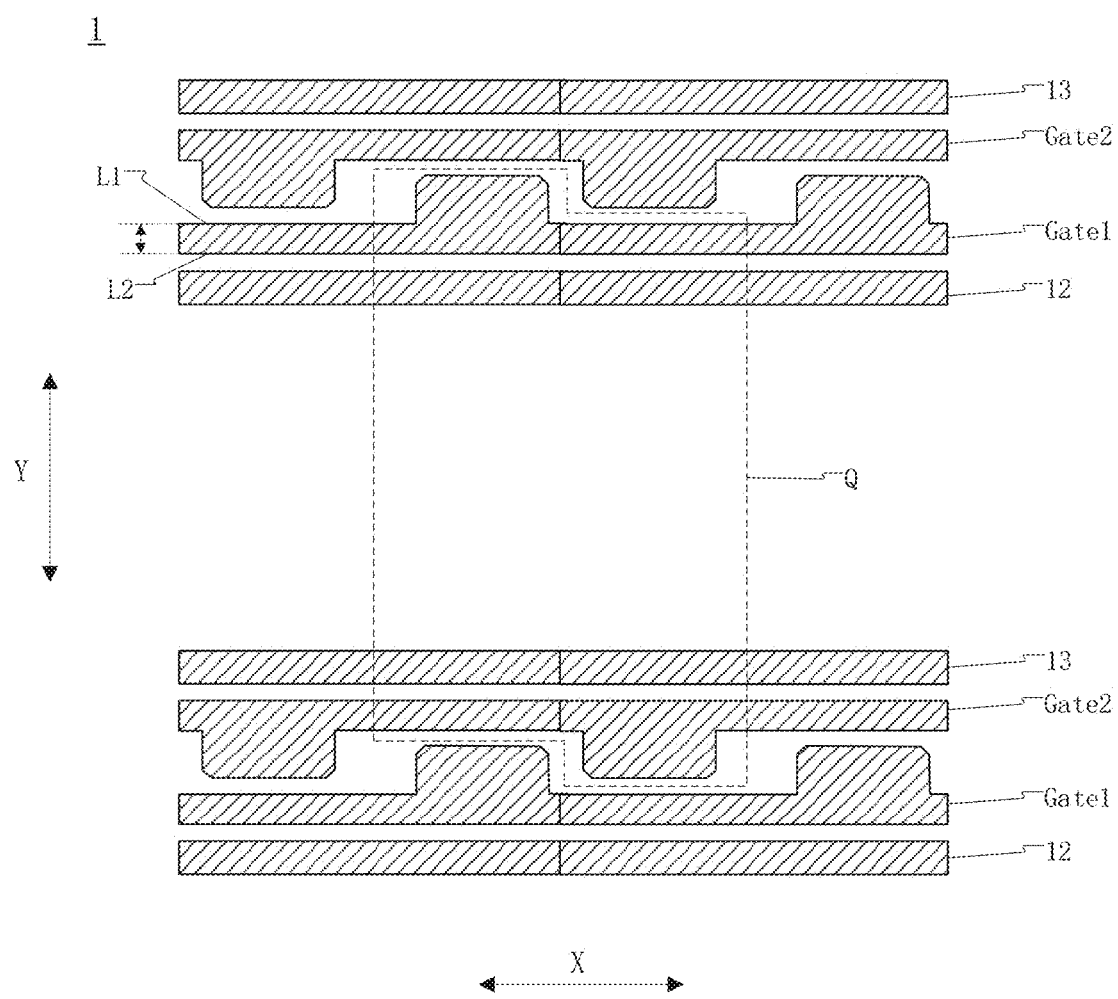
Figure 17:
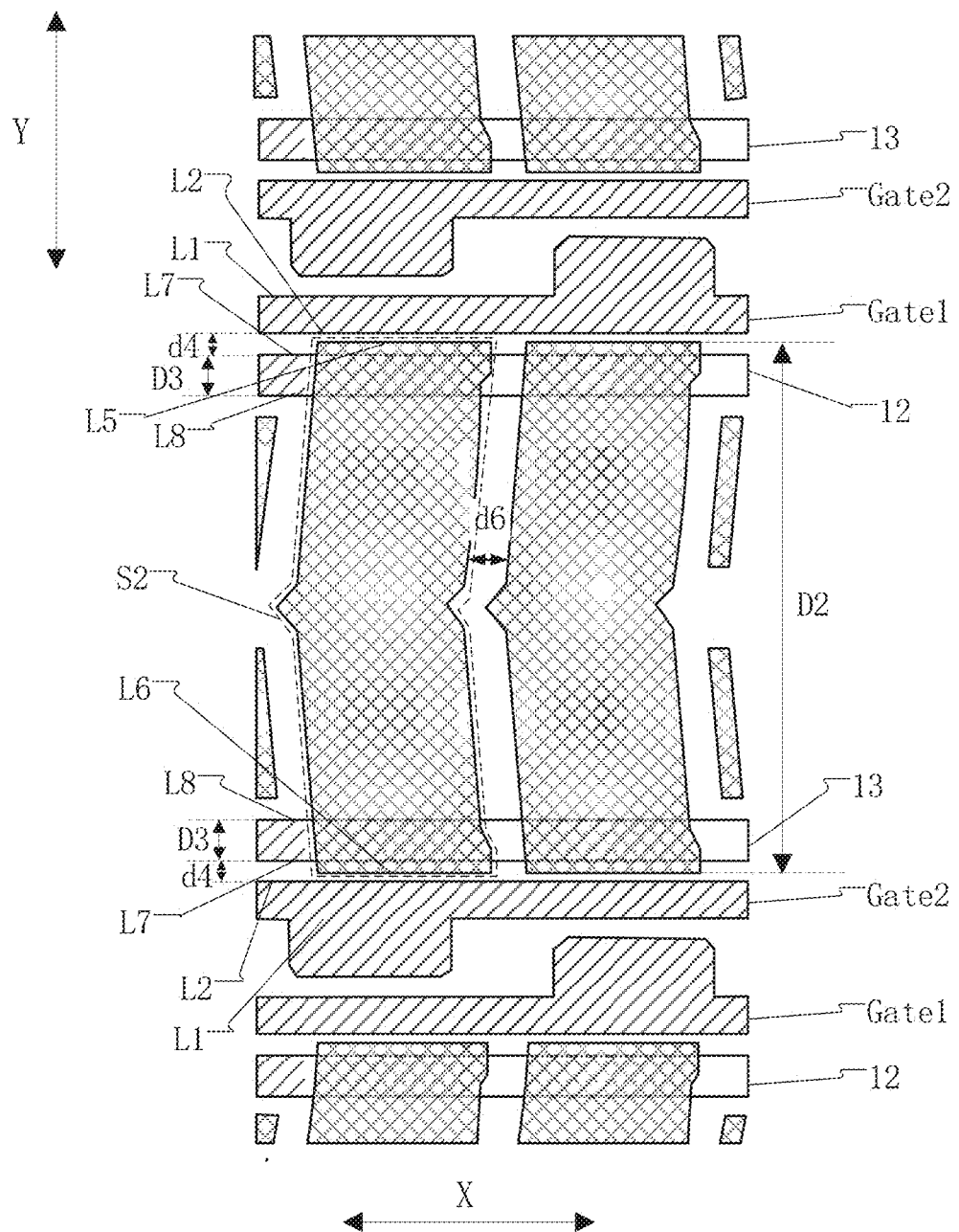
FIG. 17 is a stacked layout of a first conductive layer and a second conductive layer.

FIG. 15 is a structural layout of a display panel according to yet another embodiment of the present disclosure, FIG. 16a is a structural layout of a first conductive layer in FIG. 15, FIG. 16b is a structural layout of one repeating unit of a first conductive layer in FIG. 15, and FIG. 17 is a stacked layout of a first conductive layer and a second conductive layer. As shown in FIGS. 15 and 16a, in an embodiment of the present disclosure, the first conductive layer 1 may further include a second conductive line 12 and a third conductive line 13. Both an orthographic projection of the second conductive line 12 on the base substrate and an orthographic projection of the third conductive line 13 on the base substrate may extend along the row direction. In addition, both the second conductive line 12 and the third conductive line 13 may extend to the non-display area to be coupled to the common electrode line, so that the second conductive line 12 and the third conductive line 13 form a partial structure of the common electrode Vcom. As mentioned above, the first pixel driving circuit P1 and the second pixel driving circuit P2 adjacent in the first direction X may form a repeating unit Q. As shown in FIG. 16b, in the same repeating unit Q, the second conductive line 12 and the third conductive line 13 are located between the first gate signal line Gate11 and the second gate signal line Gate22, and an orthographic projection of the second conductive line 12 on the base substrate is intersected with an orthographic projection on the base substrate of an end of the first electrode part Pix1 away from the first bending part Pix3. An orthographic projection of the third conductive line 13 on the base substrate is intersected with an orthographic projection on the base substrate of an end of the second electrode part Pix2 away from the first bending part Pix3. In other words, the second conductive line 12 is overlapped with the first electrode structure Pix on a side of the first electrode structure Pix close to the first gate signal line Gate1, and the third conductive line 13 is overlapped with the first electrode structure Pix of the pixel unit on a side of the first electrode structure Pix close to the second gate signal line Gate2. This is equivalent to forming, at both ends in the column direction of the pixel electrode Vpixel, the second conductive line 12 and the third conductive line 13 overlapping the pixel electrode Vpixel, thereby increasing an overlapping area of the common electrode Vcom and the pixel electrode Vpixel, and in turn increasing the storage capacitor Cst. In this embodiment, the second conductive line 12 and the third conductive line 13 are provided on both sides of the pixel unit in the column direction, and a double conductive line is formed to overlap with the pixel electrode Vpixel, and thus the amount of increase in the capacitance is relatively large, that is, the pixel space can be used to fully increase the amount of increase in the capacitance of the storage capacitor Cst. The first gate signal line Gate11 is the gate signal line in the first pixel driving circuit P1, and the second gate signal line Gate22 is the gate signal line in the second pixel driving circuit P2.

In an embodiment of the present disclosure, the second conductive line 12 and the third conductive line 13 may have the same structure, and the orthographic projections of the second conductive line 12 and the third conductive line 13 on the base substrate may be axially symmetrical about the orthographic projection of the first bending part Pix3 on the base substrate.

As shown in FIG. 17, in an embodiment of the present disclosure, the orthographic projections of the second conductive line 12 and the third conductive line 13 on the base substrate each have a seventh side L7 and an eighth side L8 opposite to each other in the column direction. The seventh side L7 is located on a side of the eighth side L8 close to an orthographic projection of the corresponding gate signal line on the base substrate, and there is a third width D3 in the column direction between the seventh side L7 and the eighth side L8. The orthographic projection of the body part of the gate signal line on the base substrate has a first side L1 and a second side L2 opposite to each other in the column direction. The first side L1 is located on a side of the second side L2 away from an orthographic projection of the corresponding first electrode structure Pix on the base substrate, and there is a fourth distance d4 in the column direction between the seventh side L7 and the second side L2 of the orthographic projection of the corresponding gate signal line on the base substrate. In this embodiment, a certain space can be reserved for the second conductive line 12 and the third conductive line 13 by reducing the width of the gate signal line Gate in the column direction, in order to make the first electrode structure Pix extend to both sides in the column direction, so that both ends of the first electrode structure Pix in the column direction overlap with the provided second conductive line 12 and third conductive line 13, respectively, thereby increasing the storage capacior Cst, and thus, the amount of increase in the capacitance of the storage capacitor Cst is larger. It can be understood that the fourth distance d4 is limited by process conditions. If the process capability allows, the fourth distance d4 may be as small as possible to increase the widths of the second conductive line 12 and the third conductive line 13 in the column direction, and increase the overlapping area with the first electrode structure Pix.

As shown in FIG. 17, in an embodiment of the present disclosure, there is the third width D3 in the column direction between the seventh side L7 and the eighth side L8. The orthographic projection of the first electrode structure Pix on the base substrate has a fifth side L5 and a sixth side L6 opposite to each other in the column direction, and there is a second width D2 in the column direction between the fifth side L5 and the sixth side L6. A ratio of the third width D3 to the second width D2 may be 0.05 to 0.06, which may be, for example, 0.05, 0.054, 0.055, 0.058, 0.06, etc. Therefore, the widths of the second conductive line 12 and the third conductive line 13 can be determined according to the size of the pixel electrode in the Array stage.

Figure 18:
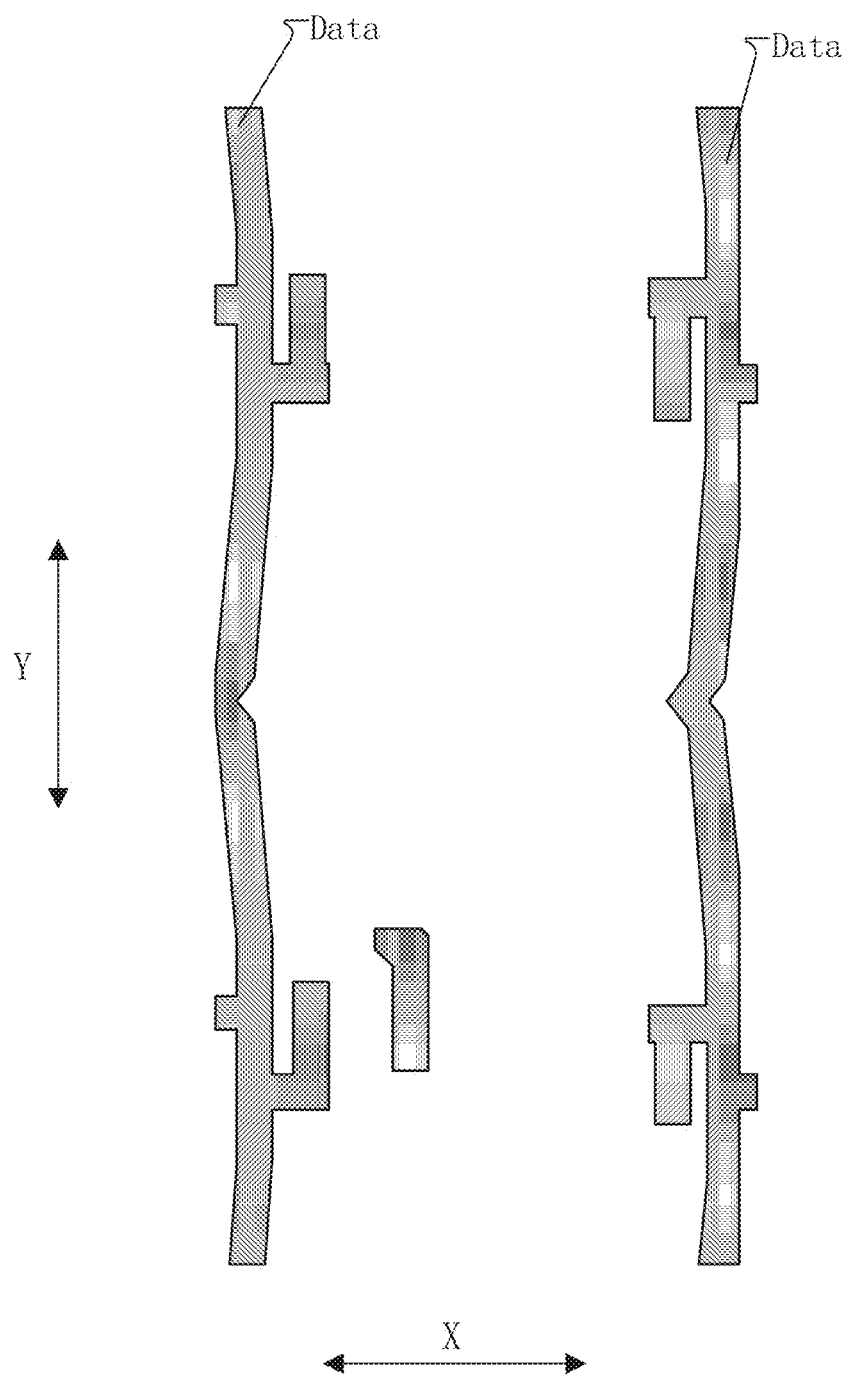
FIG. 18 is a structural layout of a third conductive layer in FIG. 12.
Figure 19:
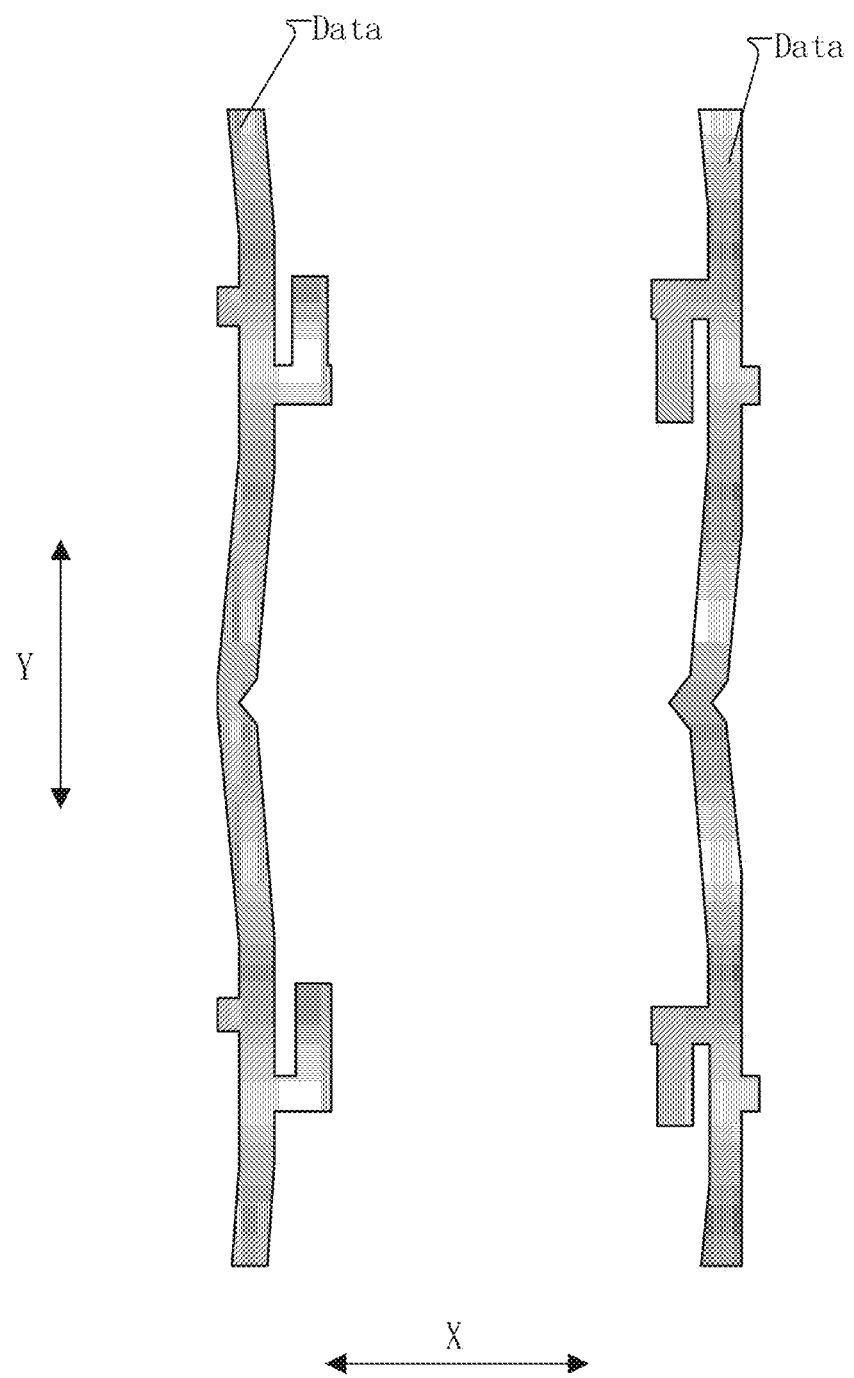
FIG. 19 is a structural layout of a third conductive layer in FIG. 15.

FIG. 18 is a structural layout of a third conductive layer in FIG. 12, and FIG. 19 is a structural layout of a third conductive layer in FIG. 15. As shown in FIGS. 18 and 19, in an embodiment of the present disclosure, the third conductive layer 4 may also not include the virtual signal line D-line, that is, the virtual signal line D-line is not provided in the gap between two repeating units Q adjacent in the row direction. On this basis, due to the existence of the gap, an extension length in the row direction of the first electrode structure Pix in the second conductive layer 3 may be increased, thereby increasing an overlapping area of the first electrode structure Pix and the second electrode structure Com, and in turn increasing the capacitance of the storage capacitor Cst. In this embodiment, the capacitance of the storage capacitor Cst can be increased without affecting the pixel display effect.

Referring to FIGS. 2 and 15, in the layout structure shown in FIG. 2, the third conductive layer 4 includes the virtual signal line D-line. Correspondingly, as shown in FIG. 10, there is a fifth distance d5 in the row direction between an orthographic projection of the first electrode structure Pix in the first pixel driving circuit P1 on the base substrate and an orthographic projection on the base substrate of the first electrode structure Pix in the second pixel driving circuit P2 in the repeating unit adjacent in the row direction. In the structure shown in FIG. 15, the third conductive layer 4 does not include the virtual signal line D-line. Correspondingly, as shown in FIG. 17, in any two repeating units adjacent in the row direction, there is a sixth distance d6 in the row direction between the orthographic projection of the first electrode structure Pix in the first pixel driving circuit P1 on the base substrate and the orthographic projection on the base substrate of the first electrode structure Pix in the second pixel driving circuit P2 in the adjacent repeating unit. The fifth distance d5 is greater than the sixth distance d6.

With the continued reference to FIGS. 2 and 15, in the layout structure shown in FIG. 2, the third conductive layer 4 includes the virtual signal line D-line. Under this structure, as shown in FIG. 10, in the same repeating unit, the orthographic projection of the first electrode structure Pix on the base substrate and the orthographic projection of the second electrode structure Com on the base substrate have a first overlapping area S1. In the layout structure shown in FIG. 15, the third conductive layer 4 does not include the virtual signal line D-line. Under this structure, as shown in FIG. 17, an area of the first electrode structure Pix is increased, and in the same repeating unit, the orthographic projection of the first electrode structure Pix on the base substrate and the orthographic projection of the second electrode structure Com on the base substrate have a second overlapping area S1, and the first overlapping area S1 is smaller than the second overlapping area S2. That is, in a case that a size of the second electrode structure Com in the fourth conductive layer 5 remains unchanged, the size of the first electrode structure Pix of the second conductive layer 3 is increased by canceling the virtual signal line D-line in the third conductive layer 4, thereby increasing the overlapping area of the first electrode structure Pix and the second electrode structure Com, and in turn increasing the storage capacitor Cst. In an embodiment of the present disclosure, a ratio of the first overlapping area S1 to the second overlapping area S2 may be 0.77 to 0.79, which may be, for example, 0.77, 0.775, 0.78, 0.785, 0.79, etc.

It should be noted that in the solution of improving the screen jitter by increasing the capacitance of the storage capacitor Cst in the above embodiments of the present disclosure, as shown in Table 2, although the capacitance of the storage capacitor Cst is increased, it does not significantly increase the load of the display panel. Since the product uses the low-frequency driving, the overall power consumption of the product is reduced. It can be seen from the equivalent pixel circuit diagram in FIG. 1 that the storage capacitor Cst is connected in parallel with the liquid crystal capacitor Clc, and the capacitor Clc is small, and the actual change in the capacitor Cst has little impact on the overall loading of the screen. It can be seen that in the present disclosure, by increasing the capacitance of the storage capacitor Cst, the jitter phenomenon of the display panel during low-frequency driving can be improved without significantly increasing the load of the display panel.

TABLE 2

| Item | | Parameter before capacitance adjustment | Add a first conductive line | Add a second conductive line and a third conductive line | Without a virtual signal line to increase a pixel electrode area |
|---|---|---|---|---|---|
| Pixel | Cst(fF) | 71.9 | 84.8 | 100.8 | 125.2 |
| | Cl(fF) | 11.3 | 11.3 | 11.3 | 11.3 |

TABLE 2-continued

| Item | | Parameter before capacitance adjustment | Add a first conductive line | Add a second conductive line and a third conductive line | Without a virtual signal line to increase a pixel electrode area |
|---|---|---|---|---|---|
| Gate Line | R(kΩ) | 1.17 | 1.17 | 1.46 | 1.17 |
| | C(pF) | 10.85 | 11.66 | 11.69 | 11.73 |
| | Delay(μm) | 0.013 | 0.016 | 0.017 | 0.017 |
| Data Line | R(kΩ) | 2.56 | 2.56 | 2.56 | 2.56 |
| | C(pF) | 21.62 | 21.62 | 21.62 | 21.62 |
| | Delay(μm) | 0.055 | 0.055 | 0.055 | 0.055 |

In addition, the present disclosure further provides a display device, which includes the display panel described in any of the above embodiments of the present disclosure.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:

1. A display panel, wherein the display panel comprises a plurality of pixel driving circuits distributed in an array along a first direction and a second direction, a pixel driving circuit comprises a driving transistor, and a gate of the driving transistor is coupled to a gate signal line, the first direction is intersected with the second direction, and wherein the display panel further comprises:
   a base substrate;
   a first conductive layer located on a side of the base substrate and comprising:
      a plurality of gate signal lines, wherein the gate signal line comprises a body part and a plurality of additional parts, an orthographic projection of the body part on the base substrate is extended along the first direction, the plurality of additional parts are distributed at intervals in the first direction and coupled to a side of the body part in the second direction, and an additional part is configured to form the gate of the driving transistor;
   an active layer located on a side of the first conductive layer and comprising:
      a plurality of active structures disposed corresponding to the plurality of additional parts, wherein orthographic projections of the plurality of active structures on the base substrate are separated from each other, an active structure comprises a plurality of active parts separated from each other, and an active part is configured to form a channel region of the driving transistor;
   wherein one additional part corresponds to the plurality of active parts, and an orthographic projection of the additional part on the base substrate covers orthographic projections of the plurality of active parts corresponding to the additional part on the base substrate.

2. The display panel according to claim 1, wherein the plurality of active parts comprise a first active part and a second active part spaced apart from each other in the first direction; and
   wherein the orthographic projection of the additional part on the base substrate covers an orthographic projection of a first active part corresponding to the additional part on the base substrate and an orthographic projection of a second active part corresponding to the additional part on the base substrate.

3. The display panel according to claim 2, wherein:
   a second electrode of the driving transistor is coupled to a pixel electrode;
   the first direction is a row direction, and the second direction is a column direction;
   the display panel further comprises:
   a second conductive layer located on a side of the active layer away from the base substrate and comprising:
      a plurality of first electrode structures in a one-to-one correspondence with the plurality of additional parts, wherein a first electrode structure is configured to form the pixel electrode;
   wherein the plurality of pixel driving circuits comprise first pixel driving circuits and second pixel driving circuits alternately distributed in sequence in the row direction, the first pixel driving circuits are located in the same column, and the second pixel driving circuits are located in the same column;
   a gate signal line in a first pixel driving circuit is a first gate signal line, and a gate signal line in a second pixel driving circuit is a second gate signal line;
   orthographic projections of the first gate signal line and the second gate signal line in a current row on the base substrate are respectively located both sides in the column direction of an orthographic projection of a first electrode structure in the current row on the base substrate;
   an additional part in the first gate signal line in the current row is located between a corresponding body part and a body part of a second gate signal line in a previous row, and an additional part in the second gate signal line in the previous row is located between a corresponding body part and the body part of the first gate signal line in the current row.

4. The display panel according to claim 3, wherein the orthographic projection of the additional part on the base substrate covers an orthographic projection of an active structure corresponding to the additional part on the base substrate.

5. The display panel according to claim 4, wherein a distance between an edge of the orthographic projection of the active structure on the base substrate and an edge of the orthographic projection of the additional part on the base substrate is greater than or equal to 2.5 μm.

6. The display panel according to claim 4, wherein the orthographic projection of the body part on the base substrate has a first side and a second side opposite to each other in the column direction, the first side is located on a side of the second side away from an orthographic projection of a corresponding first electrode structure on the base substrate, and a first distance exists between the first side and the second side; and
   a second distance exists between the orthographic projection of the first electrode structure on the base substrate and the second side corresponding to the first electrode structure, the second distance is greater than or equal to 2.5 μm, and the first distance is greater than the second distance.

7. The display panel according to claim 3, wherein:
the pixel driving circuit further comprises a storage capacitor, a first electrode of the storage capacitor is coupled to the pixel electrode, and a second electrode of the storage capacitor is coupled to a common electrode;
the display panel further comprises:
a fourth conductive layer located on a side of the second conductive layer away from the base substrate and comprising:
a plurality of second electrode structures, respective second electrode structures are coupled to each other to form a grid structure, and an orthographic projection of a second electrode structure on the base substrate is partially overlapped with an orthographic projection of a first electrode structure on the base substrate;
wherein the first electrode structure is further configured to form the first electrode of the storage capacitor, and the second electrode structure is further configured to form the second electrode of the storage capacitor.

8. The display panel according to claim 7, wherein:
the first electrode structure comprises a first electrode part and a second electrode part, and an extension direction of the first electrode part is intersected with an extension direction of the second electrode part; and
the extension direction of the first electrode part has a first comprised angle with the column direction, the extension direction of the second electrode part has a second comprised angle with the column direction, the first comprised angle is the same as the second comprised angle, an extension length of the first electrode part is the same as an extension length of the second electrode part, and the first electrode part and the second electrode part are coupled to a first bending part.

9. The display panel according to claim 8, wherein the first conductive layer further comprises:
a first conductive line, wherein an orthographic projection of the first conductive line on the base substrate is extended along the row direction, the first conductive line is coupled to the second electrode structure, and an orthographic projection of the first conductive line on the base substrate is at least partially overlapped with an orthographic projection of the first bending part on the base substrate.

10. The display panel according to claim 9, wherein the orthographic projection of the first bending part on the base substrate is covered by the orthographic projection of the first conductive line on the base substrate.

11. The display panel according to claim 9, wherein:
the orthographic projection of the first conductive line on the base substrate has a third side and a fourth side opposite to each other in the column direction, and a first width in the column direction exists between the third side and the fourth side;
the orthographic projection of the first electrode structure on the base substrate has a fifth side and a sixth side opposite to each other in the column direction, and a second width in the column direction exists between the fifth side and the sixth side; and
a ratio of the first width to the second width is 0.05 to 0.06.

12. The display panel according to claim 8, wherein:
the display panel comprises a plurality of repeating units, a repeating unit comprises a first pixel driving circuit and a second pixel driving circuit adjacent in the row direction;
the first conductive layer further comprises:
a second conductive line, wherein an orthographic projection of the second conductive line on the base substrate is extended along the row direction, and the second conductive line is coupled to the second electrode structure; and
a third conductive line, wherein an orthographic projection of the third conductive line on the base substrate is extended along the row direction, and the third conductive line is coupled to the second electrode structure;
wherein in the same repeating unit, the second conductive line and the third conductive line are located between the first gate signal line and the second gate signal line,
the orthographic projection of the second conductive line on the base substrate is intersected with an orthographic projection on the base substrate of an end of the first electrode part away from the first bending part; and
the orthographic projection of the third conductive line on the base substrate is intersected with an orthographic projection on the base substrate of an end of the second electrode part away from the first bending part.

13. The display panel according to claim 12, wherein:
orthographic projections of the second conductive line and the third conductive line on the base substrate each have a seventh side and an eighth side opposite to each other in the column direction, and a third width in the column direction exists between the seventh side and the eighth side;
the orthographic projection of the first electrode structure on the base substrate has a fifth side and a sixth side opposite to each other in the column direction, and a second width in the column direction exists between the fifth side and the sixth side; and
a ratio of the third width to the second width is 0.05 to 0.06.

14. The display panel according to claim 12, wherein the display panel further comprises:
a third conductive layer located on a side of the second conductive layer away from the base substrate and comprising:
a virtual signal line, wherein an orthographic projection of the virtual signal line on the base substrate is extended along the column direction, and is located between orthographic projections on the base substrate of two repeating units adjacent in the row direction;
wherein in the same repeating unit, an orthographic projection of a first electrode structure on the base substrate has a first overlapping area S1 with an orthographic projection of a second electrode structure on the base substrate; and
a fifth distance in the row direction exists between an orthographic projection of a first electrode structure in a first pixel driving circuit on the base substrate and an orthogonal projection on the base substrate of a first electrode structure in a second pixel driving circuit in an adjacent repeating unit in the row direction.

15. The display panel according to claim 3, wherein:
a first electrode of the driving transistor is coupled to a data signal terminal;

the active structure further comprises:
- a first sub-active part disposed corresponding to the first active part and coupled to a side of the first active part, wherein the first sub-active part is configured to form the first electrode of the driving transistor;
- a second sub-active part disposed corresponding to the second active part and coupled to a side of the second active part away from the first active part, wherein the second sub-active part is configured to form a second electrode of the driving transistor; and
- a third sub-active part coupled between the first active part and second active part that correspond to the third sub-active part;

the display panel further comprises:
a third conductive layer located on a side of the second conductive layer away from the base substrate and comprising:
- a first conductive part, wherein an orthographic projection of the first sub-active part on the base substrate is covered by an orthographic projection of the first conductive part on the base substrate, and the first conductive part is electrically coupled to the first sub-active part to be coupled to the first electrode of the driving transistor;
- a second conductive part, wherein an orthographic projection of the second sub-active part on the base substrate is covered by an orthographic projection of the second conductive part on the base substrate, and the second conductive part is electrically coupled to the second sub-active part to be coupled to the second electrode of the driving transistor; and
- a third conductive part disposed in a one-to-one correspondence with the third sub-active part, and located between the first conductive part and the second conductive part, wherein an orthographic projection of the third conductive part on the base substrate covers an orthographic projection of the corresponding third sub-active part on the base substrate.

16. The display panel according to claim 15, wherein the third conductive layer further comprises:
- a data signal line, wherein an orthographic projection of the data signal line on the base substrate is extended along the column direction, and the data signal line is coupled to the first conductive layer part to be coupled to the first electrode of the driving transistor;
- wherein the display panel comprises a plurality of repeating units, and a repeating unit comprises a first pixel driving circuit and a second pixel driving circuit adjacent in the row direction; and
- the same data signal line is reused by a first pixel driving circuit in a repeating unit in a current row and a second pixel driving circuit in a repeating unit in a previous row.

17. The display panel according to claim 16, wherein the second conductive layer further comprises:
- a backup conductive part located between a first pixel driving circuit and a second pixel driving circuit that are adjacent;
- wherein an orthographic projection of the backup conductive part on the base substrate is located within an orthographic projection of a corresponding data signal line on the base substrate.

18. A display device, comprising a display panel, wherein the display panel comprises: a plurality of pixel driving circuits distributed in an array along a first direction and a second direction, a pixel driving circuit comprises a driving transistor, and a gate of the driving transistor is coupled to a gate signal line, the first direction is intersected with the second direction, and wherein the display panel further comprises:
- a base substrate;
- a first conductive layer located on a side of the base substrate and comprising:
  - a plurality of gate signal lines, wherein the gate signal line comprises a body part and a plurality of additional parts, an orthographic projection of the body part on the base substrate is extended along the first direction, the plurality of additional parts are distributed at intervals in the first direction and coupled to a side of the body part in the second direction, and an additional part is configured to form the gate of the driving transistor;
- an active layer located on a side of the first conductive layer and comprising:
  - a plurality of active structures disposed corresponding to the plurality of additional parts, wherein orthographic projections of the plurality of active structures on the base substrate are separated from each other, an active structure comprises a plurality of active parts separated from each other, and an active part is configured to form a channel region of the driving transistor;
- wherein one additional part corresponds to the plurality of active parts, and an orthographic projection of the additional part on the base substrate covers orthographic projections of the plurality of active parts corresponding to the additional part on the base substrate.

* * * * *